United States Patent
Nagahama et al.

(10) Patent No.: US 12,542,331 B2
(45) Date of Patent: Feb. 3, 2026

(54) BATTERY PACK

(71) Applicant: MAKITA CORPORATION, Anjo (JP)

(72) Inventors: Tatsuya Nagahama, Anjo (JP); Minoru Gyoda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 994 days.

(21) Appl. No.: 17/761,535

(22) PCT Filed: Sep. 24, 2020

(86) PCT No.: PCT/JP2020/036135
§ 371 (c)(1),
(2) Date: Mar. 17, 2022

(87) PCT Pub. No.: WO2021/065688
PCT Pub. Date: Apr. 8, 2021

(65) Prior Publication Data
US 2022/0367963 A1    Nov. 17, 2022

(30) Foreign Application Priority Data

Sep. 30, 2019  (JP) .................................. 2019-180796

(51) Int. Cl.
*H01M 50/296*   (2021.01)
*B25F 5/00*   (2006.01)
(Continued)

(52) U.S. Cl.
CPC ....... *H01M 50/296* (2021.01); *H01M 50/213* (2021.01); *H01M 50/24* (2021.01);
(Continued)

(58) Field of Classification Search
CPC ............. H01M 50/296; H01M 50/213; H01M 50/247; H01M 50/284; B25F 5/00
See application file for complete search history.

(56) References Cited

U.S. PATENT DOCUMENTS

| | | | |
|---|---|---|---|
| 2012/0045667 A1* | 2/2012 | Yoneda | H01M 50/296 429/7 |
| 2014/0302353 A1* | 10/2014 | Ogura | H01M 50/572 429/7 |
| 2020/0161609 A1 | 5/2020 | Murakami et al. | |

FOREIGN PATENT DOCUMENTS

| | | |
|---|---|---|
| CN | 102376922 A | 3/2012 |
| EP | 2 421 067 A1 | 2/2012 |
| | (Continued) | |

OTHER PUBLICATIONS

Dec. 8, 2020 Written Opinion of the International Searching Authority issued in Patent Application No. PCT/JP2020/036135.
(Continued)

*Primary Examiner* — Brittany L Raymond
(74) *Attorney, Agent, or Firm* — Oliff PLC

(57) ABSTRACT

A battery pack may include a battery cell; a control board disposed above the battery cell and connected to the battery cell; a plurality of terminals disposed on the control board and disposed side by side in a left-right direction; a plurality of partition wall disposed on the control board; and an outer case housing the battery cell, the control board, the plurality of terminals, and the plurality of partition walls, and having an upper surface comprising a terminal reception part configured to receive a terminal of the power tool. The plurality of terminals may include a first terminal and a second terminal adjacent to the first terminal in the left-right direction. At least two of the partition walls are disposed between the first terminal and the second terminal.

17 Claims, 29 Drawing Sheets

(51) Int. Cl.
    *H01M 50/213*    (2021.01)
    *H01M 50/24*     (2021.01)
    *H01M 50/247*    (2021.01)
    *H01M 50/284*    (2021.01)

(52) U.S. Cl.
    CPC ....... *H01M 50/247* (2021.01); *H01M 50/284* (2021.01); *B25F 5/00* (2013.01); *H01M 2220/30* (2013.01)

(56) References Cited

FOREIGN PATENT DOCUMENTS

| | | |
|---|---|---|
| JP | 2011-009023 A | 1/2011 |
| JP | 2012-043684 A | 3/2012 |
| JP | 2014-203702 A | 10/2014 |
| JP | 2014-203703 A | 10/2014 |
| WO | 2019/017184 A1 | 1/2019 |

OTHER PUBLICATIONS

Dec. 8, 2020 International Search Report issued in Patent Application No. PCT/JP2020/036135.
Feb. 9, 2024 Partial European Search Report issued in European Patent Application No. 20872405.4.
Nov. 16, 2023 Office Action Issued in Chinese Patent Application No. 202080068240.9.
Oct. 4, 2022 Office Action issued in Japanese Patent Application No. 2021-551168.

\* cited by examiner (Second Embodiment)

(Third Embodiment)

(Fourth Embodiment)

(Fourth Embodiment)

(Fourth Embodiment)

(Fifth Embodiment)

(Fifth Embodiment)

(Fifth Embodiment)

(Sixth Embodiment)

(Sixth Embodiment)

(Sixth Embodiment)

BATTERY PACK

TECHNICAL FIELD

The art disclosed herein relates to a battery pack.

BACKGROUND ART

Japanese Patent Application Publication No. 2011-9023 describes a battery pack configured to be mounted on a power tool by being slid from front to rear. The battery pack includes a battery cell, a control board disposed above the battery cell and connected to the battery cell, a plurality of terminals disposed on the control board and disposed side by side in a left-right direction, and an outer case housing the battery cell, the control board, and the plurality of terminals and having an upper surface including a terminal reception part configured to receive a terminal of the power tool.

SUMMARY OF INVENTION

Technical Problem

In a battery pack as above, water may enter inside the outer case from the terminal reception part. When water enters inside the outer case, the terminals disposed on the control board could be short-circuited by the water.

The description herein provides an art configured to suppress terminals inside an outer case from being short-circuited when water enters inside the outer case.

Solution to Technical Problem

A battery pack disclosed herein may be configured to be mounted on a power tool by being slid from front to rear. The battery pack may comprise: a battery cell; a control board disposed above the battery cell and connected to the battery cell; a plurality of terminals disposed on the control board and disposed side by side in a left-right direction; a plurality of partition walls disposed on the control board; and an outer case housing the battery cell, the control board, the plurality of terminals, and the plurality of partition walls, and having an upper surface comprising a terminal reception part configured to receive a terminal of the power tool, wherein the plurality of terminals includes a first terminal and a second terminal adjacent to the first terminal in the left-right direction, and at least two of the partition walls are disposed between the first terminal and the second terminal.

In the above battery pack, a creepage distance between the first and second terminals adjacent to each other in the left-right direction can be set longer than in a case where there is only one partition wall and a case where there is no partition wall. Due to this, even when water enters inside the outer case, the terminals adjacent in the left-right direction can be suppressed from being short-circuited.

Another battery pack disclosed herein may be configured to be mounted on a power tool by being slid. The battery pack may comprise: a battery cell; a control board disposed above the battery cell and connected to the battery cell; a plurality of terminals disposed on the control board; a first partition wall disposed on the control board and surrounding a periphery of the first terminal among the plurality of terminals; and an outer case having an upper surface comprising a terminal reception part configured to receive a terminal of the power tool, wherein a board hole is defined in the control board that is inside the first partition wall.

In the battery pack with the above configuration, a creepage distance between the first terminal of which periphery is surrounded by the first partition wall and all other terminals can be set longer than in a case where there is no first partition wall. Further, since the board hole is defined in the control board inside the first partition wall, the water does not stay inside the first partition wall. Due to this, the water can be suppressed from being collected inside the first partition wall and overflowing to outside of the first partition wall, and the first terminal of which periphery is surrounded by the first partition wall can be suppressed from being short-circuited with the other terminals via the water.

Another battery pack disclosed herein may be configured to be mounted on a power tool by being slid from front to rear. The battery pack may comprise: a battery cell; a control board disposed above the battery cell and connected to the battery cell; a plurality of terminals disposed on the control board; one or more partition walls disposed on the control board; and an outer case having an upper surface comprising a terminal reception part configured to receive a terminal of the power tool, wherein the plurality of terminals includes one or more power terminals and one or more signal terminals disposed side by side with the one or more power terminals in the left-right direction, a first front-rear directional partition wall extending in a front-rear direction is disposed between the power terminal and the signal terminal that are disposed side by side at a frontmost side among the power terminals and the signal terminals that are disposed side by side in the left-right direction, and a left-right directional partition wall extending in the left-right direction is disposed in front of one of the power terminal and the signal terminal that are disposed side by side at the frontmost side, and the left-right directional partition wall is not disposed in front of another of the power terminal and the signal terminal that are disposed side by side at the frontmost side.

Water that entered into the outer case and reached the control board flows thereon in various directions in accordance with an orientation of the battery pack. Due to this, even when a front-rear directional partition wall is disposed between terminals, the water could flow around the front-rear directional partition wall and short-circuit the terminals. In the above battery pack, the first front-rear directional partition wall can set a long creepage distance in the left-right direction between the power terminal and the signal terminal disposed side by side at the frontmost side. Further, in the above battery pack, the left-right directional partition wall can set a long creepage distance between the power terminal and the signal terminal disposed side by side at the frontmost side for a case where water flows around the first front-rear directional partition wall. Thus, the power terminal and the signal terminal disposed side by side at the frontmost side can be suppressed from short-circuiting when the water enters into the outer case.

Further, in the above configuration, the power tool is attached to a rear side of the battery pack. Moreover in general, in a control board, an element area where circuit elements are arranged is provided on an opposite side from the side where the power tool is to be attached. In the above configuration, the left-right directional partition wall is disposed in front of one of the power terminal and the signal terminal disposed side by side at the frontmost side while the left-right directional partition wall is not disposed in front of the other thereof. Due to this, an area within the control board that can be used as the element area can be increased as compared to a case where the left-right directional partition wall is disposed in front of both the power terminal and the signal terminal disposed side by side at the frontmost side.

Another battery pack disclosed herein may be configured to be mounted on a power tool by being slid. The battery pack may comprise: a battery cell; a control board disposed above the battery cell and connected to the battery cell; a plurality of terminals disposed on the control board; one or more partition walls disposed on the control board; and an outer case housing the battery cell, the control board, the plurality of terminals, and the one or more partition walls, the outer case having an upper surface comprising a terminal reception part configured to receive a terminal of the power tool, wherein the plurality of terminals includes one or more power terminals configured to be connected to a terminal of the power tool and one or more signal terminals configured to be connected to a terminal of the power tool, and all of the plurality of the terminals are separated from other terminals by at least one partition wall.

As a countermeasure for preventing short-circuit of the plurality of terminals, it is desirable to set a creepage distance between the plurality of terminals as long as possible. In the above battery pack, all of the plurality of terminals are separated from other terminals by at least one partition wall. Due to this, the creepage distance between the plurality of terminals can be set long. Thus, the terminals within the outer case can be suppressed from short-circuiting when the water enters into the outer case.

DESCRIPTION OF EMBODIMENTS

Figure 1:
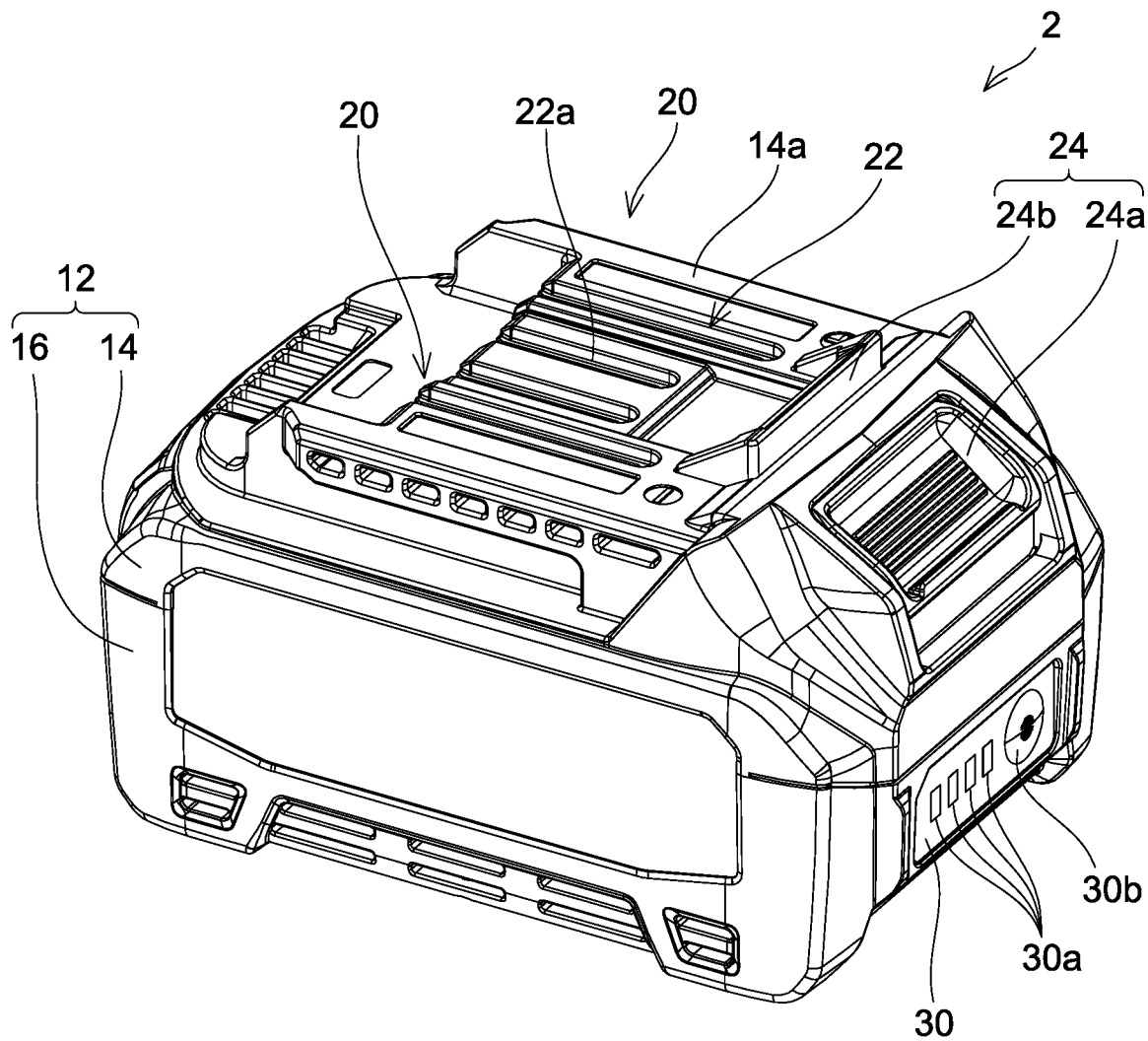
FIG. 1 is a perspective view seeing a battery pack 2 of a first embodiment from front right upper side.
Figure 1:
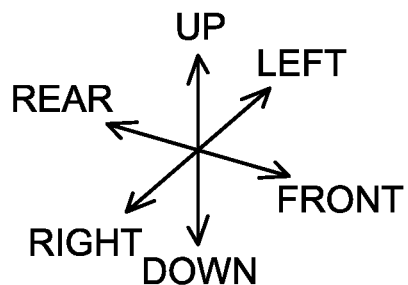

A battery pack disclosed herein may be configured to be mounted on a power tool by being slid from front to rear. The battery pack may comprise: a battery cell; a control board disposed above the battery cell and connected to the battery cell; a plurality of terminals disposed on the control board and disposed side by side in a left-right direction; a plurality of partition walls disposed on the control board; and an outer case housing the battery cell, the control board, the plurality of terminals, and the plurality of partition walls, and having an upper surface comprising a terminal reception part configured to receive a terminal of the power tool, wherein the plurality of terminals includes a first terminal and a second terminal adjacent to the first terminal in the left-right direction, and at least two of the partition walls are disposed between the first terminal and the second terminal.

In one or more aspects, the at least two partition walls, which are disposed between the first terminal and the second terminal, may include a first partition wall extending in a front-rear direction and a second partition wall disposed between the first partition wall and the second terminal and extending in the front-rear direction. The battery pack may further comprise: a coupling part coupling the first partition wall and the second partition wall. An inclined part inclined in the front-rear direction may be disposed on at least a part of an upper surface of the coupling part.

According to the above configuration, water that reached the upper surface of the coupling part flows along the inclined part and further flows out from the coupling part. Due to this, the water can be suppressed from being collected on the upper surface of the coupling part. Thus, the water that has been collected in the coupling part can be suppressed from flowing over the partition walls.

In one or more aspects, the inclined part may be inclined such that a surface of the inclined part on a first direction side in the front-rear direction is located lower than a surface of the inclined part on a second direction side opposite to the first direction side. A first control board hole may be defined in the control board more on the first direction side than the coupling part is.

According to the above configuration, the water that reached the upper surface of the coupling part flows along the inclined part and further flows out from the coupling part, and passes through the first control board hole. As such, the water can be suppressed from being collected on an upper surface of the control board.

In one or more aspects, the at least two partition walls, which are disposed between the first terminal and the second terminal, may include a first partition wall extending in a front-rear direction and a second partition wall disposed between the first partition wall and the second terminal and extending in the front-rear direction. The battery pack may further comprise: a coupling part coupling the first partition wall and the second partition wall. A through hole may be defined in the coupling part. A second control board hole may be defined in the control board that is below the through hole.

According to the above configuration, the water that reached the upper surface of the coupling part passes through the through hole and the second control board hole. Due to this, the water can be suppressed from being collected on the upper surface of the coupling part. As such, the water that has been collected in the coupling part can be suppressed from flowing over the partition walls.

In one or more aspects, the plurality of terminals may include a third terminal disposed side by side with the second terminal in the front-rear direction and adjacent to the first terminal in the left-right direction. The first partition wall may extend in the front-rear direction such that the first partition wall is disposed between the first terminal and the second terminal and disposed between the first terminal and the third terminal. The plurality of partition walls may include a third partition wall disposed between the first partition wall and the third terminal and extending in the front-rear direction. The coupling part may couple the first partition wall and the third partition wall.

According to the above configuration, water can be suppressed from being collected between the first and second terminals and also between the first and third terminals. As such, the terminals adjacent in the left-right direction can be suppressed from being short-circuited.

Another battery pack disclosed herein may be configured to be mounted on a power tool by being slid. The battery pack may comprise: a battery cell; a control board disposed above the battery cell and connected to the battery cell; a plurality of terminals disposed on the control board; a first partition wall disposed on the control board and surrounding a periphery of the first terminal among the plurality of terminals; and an outer case having an upper surface comprising a terminal reception part configured to receive a terminal of the power tool, wherein a board hole is defined in the control board that is inside the first partition wall.

In one or more aspects, the battery pack may further comprise a cell case housed inside the outer case, holding two or more of the battery cells, and disposed below the control board. The two or more battery cells may be disposed parallel to a bottom surface of the outer case and with an interval between each other. The cell case may comprise a case hole defined between two adjacent battery cells.

Water that is drained from the board hole of the control board reaches an upper surface of the cell case. According to the above configuration, the water that reached the upper surface of the cell case passes through the case hole defined in the cell case and flows out to the bottom surface of the outer case. As such, the water can be guided to a position lower than the control board and the battery cell.

In one or more aspects, the case hole of the cell case may comprise a first case hole defined in an upper surface of the cell case that is between the two adjacent battery cells and a second case hole defined in a lower surface of the cell case at a position opposed to the first case hole, in which the first case hole penetrates through the upper surface of the cell case in an up-down direction, and the second case hole penetrates through the lower surface of the cell case in the up-down direction.

According to the above configuration, the water that reached the upper surface of the cell case passes through the first case hole and enters into the cell case, reaches around the second case hole and passes through the second case hole, flows out from the cell case, and reaches the bottom surface of the outer case. As such, the water can be guided to a position lower than the control board and the battery cell.

In one or more aspects, a protruding part extending upward may be disposed on an upper surface of the cell case that is between the two adjacent battery cells at ends of the battery cells in a longitudinal direction. The case hole of the cell case may comprise a third case hole defined in the protruding part and penetrating through the protruding part in the longitudinal direction of the battery cells.

According to the above configuration, the water that reached the upper surface of the cell case flows along the upper surface of the cell case and reaches the third case hole defined in the protruding part and passes through the third case hole, and further flows out to the bottom surface of the outer case. As such, the water can be guided to a position lower than the control board and the battery cell.

In one or more aspects, the battery pack may be configured to be mounted on the power tool by being slid from front to rear. The plurality of terminals may include a second terminal adjacent to the first terminal in a left-right direction. The battery pack may further comprise: a second partition wall disposed between the first partition wall and the second terminal; and a coupling part coupling the first partition wall and the second partition wall. An inclined part inclined in the front-rear direction may be disposed on at least a part of an upper surface of the coupling part.

According to the above configuration, the water that reached the upper surface of the coupling part flows along the inclined part and further flows out from the coupling part. Due to this, the water can be suppressed from being collected on the upper surface of the coupling part. As such, the water that has been collected in the coupling part can be suppressed from flowing over the partition walls.

In one or more aspects, the inclined part may be inclined such that a surface of the inclined part on a first direction side in the front-rear direction is located lower than a surface of the inclined part on a second direction side opposite to the first direction side. A first control board hole may be defined in the control board more on the first direction side than the coupling part is.

According to the above configuration, the water that reached the upper surface of the coupling part flows along the inclined part and further flows out from the coupling part, and passes through the first control board hole. As such, the water can be suppressed from being collected on the upper surface of the control board.

In one or more aspects, the battery pack may be configured to be mounted on the power tool by being slid from front to rear. The plurality of terminals may include a second terminal adjacent to the first terminal in a left-right direction.

The battery pack may further comprise: a second partition wall disposed between the first partition wall and the second terminal; and a coupling part coupling the first partition wall and the second partition wall. A through hole may be defined in the coupling part. A second control board hole may be defined in the control board that is below the through hole.

According to the above configuration, the water that reached the upper surface of the coupling part passes through the through hole and the second control board hole. Due to this, the water can be suppressed from being collected on the upper surface of the coupling part. As such, the water that has been collected in the coupling part can be suppressed from flowing over the partition walls.

In one or more aspects, the plurality of terminals may include a third terminal disposed side by side with the second terminal in the front-rear direction and adjacent to the first terminal in the left-right direction. The battery pack may further comprise: a third partition wall disposed between the first partition wall and the third terminal. The coupling part may couple the first partition wall and the third partition wall.

According to the above configuration, water can be suppressed from being collected between the first and second terminals and also between the first and third terminals. As such, the terminals adjacent in the left-right direction can be suppressed from being short-circuited.

Another battery pack disclosed herein may be configured to be mounted on a power tool by being slid from front to rear. The battery pack may comprise: a battery cell; a control board disposed above the battery cell and connected to the battery cell; a plurality of terminals disposed on the control board; one or more partition walls disposed on the control board; and an outer case having an upper surface comprising a terminal reception part configured to receive a terminal of the power tool, wherein the plurality of terminals includes one or more power terminals and one or more signal terminals disposed side by side with the one or more power terminals in the left-right direction, a first front-rear directional partition wall extending in a front-rear direction is disposed between the power terminal and the signal terminal that are disposed side by side at a frontmost side among the power terminals and the signal terminals that are disposed side by side in the left-right direction, and a left-right directional partition wall extending in the left-right direction is disposed in front of one of the power terminal and the signal terminal that are disposed side by side at the frontmost side, and the left-right directional partition wall is not disposed in front of another of the power terminal and the signal terminal that are disposed side by side at the frontmost side.

In one or more aspects, the one or more power terminals may include a first power terminal that is the power terminal of the power terminal and the signal terminal that are adjacent to each other among the power terminal and the signal terminal disposed side by side at the frontmost side. The one or more signal terminals may include a first signal terminal that is the signal terminal of the power terminal and the signal terminal that are adjacent to each other. The first front-rear directional partition wall may be disposed between the first power terminal and the first signal terminal in the left-right direction. The left-right directional partition wall may be disposed in front of one of the first power terminal and the first signal terminal, and the left-right directional partition wall is not disposed in front of another of the first power terminal and the first signal terminal.

According to the above configuration, the first front-rear directional partition wall can set a long creepage distance in the left-right direction between the first power terminal and the first signal terminal. Further, the left-right directional partition wall can set a long creepage distance between the first power terminal and the first signal terminal for a case where water flows around the first front-rear directional partition wall. Thus, the first power terminal and the first signal terminal can be suppressed from short-circuiting when the water enters into the outer case. Further, an area within the control board that can be used as an element area can be increased as compared to a case where the left-right directional partition wall is disposed in front of both the first power terminal and the first signal terminal.

In one or more aspects, a first board hole may defined in the control board on an outer side of a terminal disposed at an outermost side in the left-right direction among the plurality of terminals.

According to the above configuration, water can be suppressed from being collected around the terminal disposed at the outermost side in the left-right direction. Further, an area within the control board that can be used as the element area can be increased as compared to a case where the first board hole is defined in the control board in front of the terminal disposed at the outermost side in the left-right direction.

In one or more aspects, a second board hole may be defined in the control board between two terminals adjacent to each other in the front-rear direction among the plurality of terminals.

According to the above configuration, an area within the control board that can be used as the element area can be increased as compared to a case where a board hole is defined in the control board in front of each of the two terminals adjacent to each other in the front-rear direction.

In one or more aspects, the one or more power terminals may include a first power terminal that is the power terminal of the power terminal and the signal terminal that are adjacent to each other among the power terminal and the signal terminal arranged side by side at the frontmost side. The one or more signal terminals may include a first signal terminal that is the signal terminal of the power terminal and the signal terminal that are adjacent to each other. The first front-rear directional partition wall may be disposed between the first power terminal and the first signal terminal in the left-right direction. A second front-rear directional partition wall extending in a front-rear direction may be disposed between the first front-rear directional partition wall and the first signal terminal. The battery pack may further comprise: a coupling part coupling the first front-rear directional partition wall and the second front-rear directional partition wall. An inclined part inclined in the front-rear direction may be disposed on at least a part of an upper surface of the coupling part.

According to the above configuration, the water that reached the upper surface of the coupling part flows along the inclined part and further flows out from the coupling part. Due to this, the water can be suppressed from being collected on the upper surface of the coupling part. As such, the water that has been collected in the coupling part can be suppressed from flowing over the partition wall.

In one or more aspects, the inclined part may be inclined such that a surface of the inclined part on a first direction side in the front-rear direction is located lower than a surface of the inclined part on a second direction side opposite to the first direction side. A first control board hole may be defined in the control board more on the first direction side than the coupling part is.

According to the above configuration, the water that reached the upper surface of the coupling part flows along the inclined part and further flows out from the coupling part, and passes through the first control board hole. As such, the water can be suppressed from being collected on the upper surface of the control board.

In one or more aspects, a second front-rear directional partition wall extending in a front-rear direction may be disposed between the first front-rear directional partition wall and the first signal terminal. The battery pack may further comprise: a coupling part coupling the first front-rear directional partition wall and the second front-rear directional partition wall. A through hole may be defined in the coupling part. A second control board hole may be defined in the control board that is below the through hole.

According to the above configuration, the water that reached the upper surface of the coupling part passes through the through hole and the second control board hole. Due to this, the water can be suppressed from being collected on the upper surface of the coupling part. As such, the water that has been collected in the coupling part can be suppressed from flowing over the partition walls.

In one or more aspects, the one or more signal terminals may include a second signal terminal disposed side by side with the first signal terminal in the front-rear direction and adjacent to the first power terminal in the left-right direction. The first front-rear directional partition wall may extend in the front-rear direction such that the first front-rear directional partition wall is disposed between the first power terminal and the first signal terminal and between the first power terminal and the second signal terminal. The battery pack may further comprise: a third front-rear directional partition wall disposed between the first front-rear directional partition wall and the second signal terminal. The coupling part may couple the first front-rear directional partition wall and the third front-rear directional partition wall.

According to the above configuration, water can be suppressed from being collected between the first power terminal and the first signal terminal and between the first power terminal and the second signal terminal. As such, the terminals adjacent in the left-right direction can be suppressed from being short-circuited.

Another battery pack disclosed herein may be configured to be mounted on a power tool by being slid. The battery pack may comprise: a battery cell; a control board disposed above the battery cell and connected to the battery cell; a plurality of terminals disposed on the control board; one or more partition walls disposed on the control board; and an outer case housing the battery cell, the control board, the plurality of terminals, and the one or more partition walls, the outer case having an upper surface comprising a terminal reception part configured to receive a terminal of the power tool, wherein the plurality of terminals includes one or more power terminals configured to be connected to a terminal of the power tool and one or more signal terminals configured to be connected to a terminal of the power tool, and all of the plurality of the terminals are separated from other terminals by at least one partition wall.

In one or more aspects, the battery pack may be configured to be mounted on the power tool by being slid from front to rear. The one or more partition walls may include a plurality of left-right directional partition walls extending in a left-right direction, the plurality of left-right directional partition walls may include a first left-right directional partition wall disposed at a rearmost side and a second left-right directional partition wall disposed more on a front side than the first left-right directional partition wall is. A height of the first left-right directional partition wall may be lower than a height of the second left-right directional partition wall.

In order to set a creepage distance that is as long as possible between the terminals, the partition walls are desirably as high as possible. However, since the power tool is attached to a rear side of the battery pack, the terminals of the power tool and the partition walls could interfere with each other if the rearmost left-right directional partition wall is designed to be high. According to the above configuration, the partition walls can be suppressed from interfering with the terminals of the power tool when the battery pack is mounted on the power tool, and further the creepage distance between the terminals can be secured to suppress short-circuiting of the plurality of terminals.

In one or more aspects, the battery pack may be configured to be mounted on the power tool by being slid from front to rear. The one or more signal terminals may include a first terminal and a second terminal adjacent to the first terminal in a left-right direction. The one or more partition walls may include a first front-rear directional partition wall disposed between the first terminal and the second terminal and extending in a front-rear direction and a second front-rear directional partition wall disposed between the first front-rear directional partition wall and the second terminal and extending in the front-rear direction. The battery pack may further comprise: a coupling part coupling the first front-rear directional partition wall and the second front-rear directional partition wall. An inclined part inclined in the front-rear direction may be disposed on at least a part of an upper surface of the coupling part.

According to the above configuration, the water that reached the upper surface of the coupling part flows along the inclined part and further flows out from the coupling part. Due to this, the water can be suppressed from being collected on the upper surface of the coupling part. Thus, the water that has been collected in the coupling part can be suppressed from flowing over the partition walls.

In one or more aspects, the inclined part may be inclined such that a surface of the inclined part on a first direction side in the front-rear direction is located lower than a surface of the inclined part on a second direction side opposite to the first direction side. A first control board hole may be defined in the control board more on the first direction side than the coupling part is.

According to the above configuration, the water that reached the upper surface of the coupling part flows along the inclined part and further flows out from the coupling part, and passes through the first control board hole. As such, the water can be suppressed from being collected on the upper surface of the control board.

In one or more aspects, the battery pack may be configured to be mounted on the power tool by being slid from front to rear. The one or more signal terminals may include a first terminal and a second terminal adjacent to the first terminal in a left-right direction. The one or more partition walls may include a first front-rear directional partition wall disposed between the first terminal and the second terminal and extending in a front-rear direction and a second front-rear directional partition wall disposed between the first front-rear directional partition wall and the second terminal and extending in the front-rear direction. The battery pack may further comprise: a coupling part coupling the first front-rear directional partition wall and the second front-rear directional partition wall. A through hole may be defined in the coupling part. A second control board hole may be defined in the control board that is below the through hole.

According to the above configuration, the water that reached the upper surface of the coupling part passes through the through hole and the second control board hole. Due to this, the water can be suppressed from being collected on the upper surface of the coupling part. Thus, the water that has been collected in the coupling part can be suppressed from flowing over the partition walls.

In one or more aspects, the plurality of terminals may include a third terminal disposed side by side with the second terminal in the front-rear direction and adjacent to the first terminal in the left-right direction. The first front-rear directional partition wall may extend in the front-rear direction such that the first front-rear directional partition wall is disposed between the first terminal and the second terminal and between the first terminal and the third terminal. The battery pack may further comprise: a third front-rear directional partition wall disposed between the first front-rear directional partition wall and the third terminal and extending in the front-rear direction. The coupling part may couple the first front-rear directional partition wall and the third front-rear directional partition wall.

According to the above configuration, the water can be suppressed from being collected between the first and second terminals and also between the first and third terminals. As such, the terminals adjacent in the left-right direction can be suppressed from being short-circuited.

First Embodiment

Figure 14:
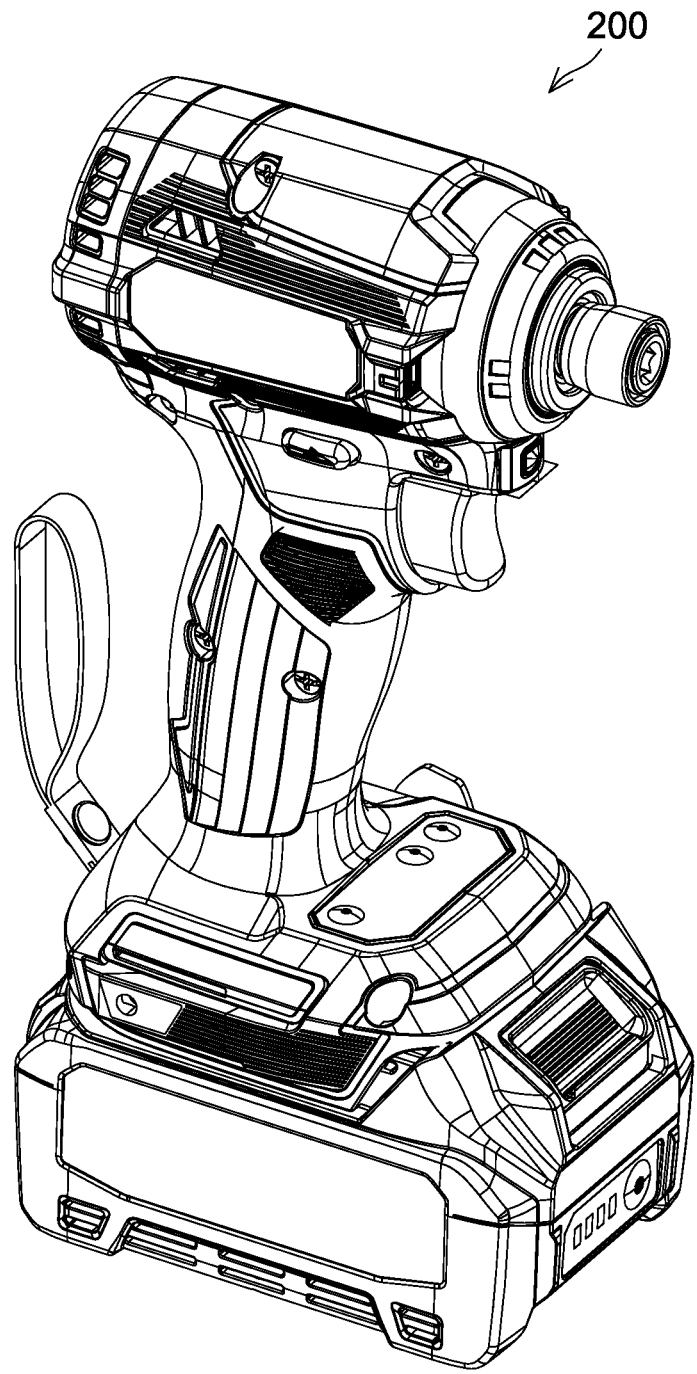
FIG. 14 is a perspective view from right upper front side seeing a state in which the battery pack 2 of the first embodiment is mounted on a power tool 200.
Figure 14:
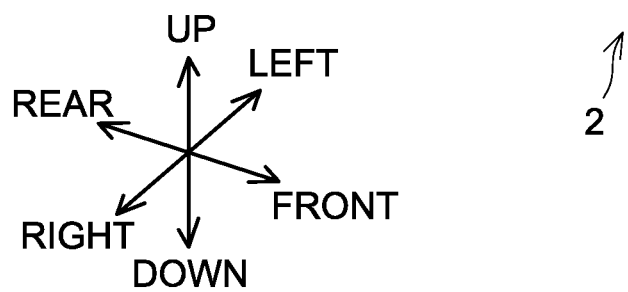

Hereinbelow, a battery pack 2 of an embodiment will be described with reference to the drawings. As shown in FIG. 14, the battery pack 2 is configured to be dismountably mounted on a power tool 200. In FIG. 14, a case in which the power tool 200 is a power screw driver is exemplified, however, the power tool 200 may for example be a power drill, a power grinder, a power circular saw, a power chainsaw, a power reciprocating saw, a power mower, a power trimmer, or a power blower. The battery pack 2 supplies power to the power tool 200 when it is mounted on the power tool 200. In the following description, with respect to the battery pack 2, a direction along which the power tool 200 is located as seen from the battery pack 2 when it is mounted on the power tool 200 will be termed 'upward', and a direction opposite thereto will be termed 'downward'. Further, with respect to the battery pack 2, a direction along which the battery pack 2 is slid upon when it is to be mounted on the power tool 200 will be termed 'rearward', and a direction along which the battery pack 2 is slid upon when it is to be dismounted from the power tool 200 will be termed 'frontward'. That is, in the following description, a front-rear direction corresponds to a sliding direction along which the battery pack 2 is slid with respect to the power tool 200.

As shown in FIGS. 1 to 13, the battery pack 2 comprises a battery module 10 (see FIG. 5) and an outer case 12 (see FIG. 1) that houses the battery module 10.

(Configuration of Outer Case 12)

As shown in FIG. 1, the outer case 12 has a substantially cuboid shape as a whole, and is divided into an upper case 14 and a lower case 16. The upper case 14 and the lower case 16 are fixed to each other by metal screws 18 (see FIG. 2).

The upper case 14 includes slide rails 20, a terminal reception part 22, and a hook 24. The slide rails 20 extend in the front-rear direction, and are respectively disposed at upper left and right ends of the upper case 14. The slide rails 20 are configured to slidably engage with slide rails of the power tool 200 (omitted from drawings) upon when the battery pack 2 is to be mounted on or dismounted from the power tool 200.

The terminal reception part 22 includes terminal openings 22a defined in an upper surface 14a of the upper case 14. The terminal openings 22a are disposed between the left and right slide rails 20, and are configured to receive a terminal unit 202 of the power tool 200 (see FIG. 15) when the battery pack 2 is to be mounted on the power tool 200. The hook 24 is disposed at a front upper portion of the upper case 14. The hook 24 is a resin member, and includes an operable part 24a and a protruding part 24b. The hook 24 is held by the upper case 14 so as to be movable in an up-down direction. The hook 24 is biased upward by a compression spring that is not shown, and is configured to move downward when the operable part 24a and/or the protruding part 24b are pressed downward. The protruding part 24b is configured to engage with an engaging groove (omitted from drawings) defined in a housing of the power tool 200 when the battery pack 2 is mounted on the power tool 200 and fix the battery pack 2 on the power tool 200. When the battery pack 2 is to be dismounted from the power tool 200, the protruding part 24b moves downward when a user presses down the operable part 24a. The battery pack 2 can be dismounted from the power tool 200 by sliding the battery pack 2 in this state. The operable part 24a has an inwardly depressed shape. Due to this, when the user is to press down the operable part 24a by placing a finger on the operable part 24a, the operable part 24a can be pressed down without the finger slipping.

Figure 2:
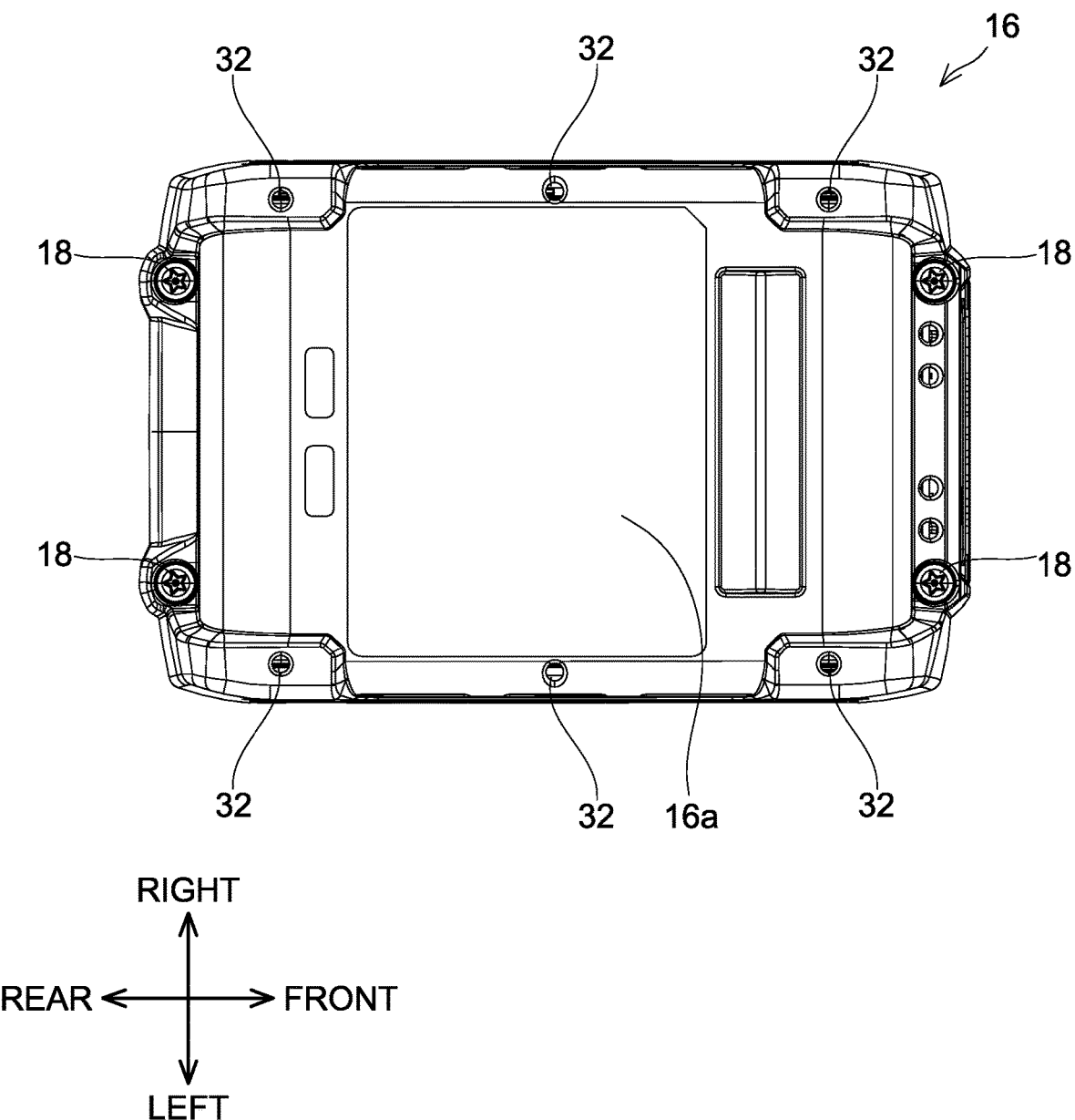
FIG. 2 is a bottom view seeing the battery pack 2 of the first embodiment from below.
Figure 3:
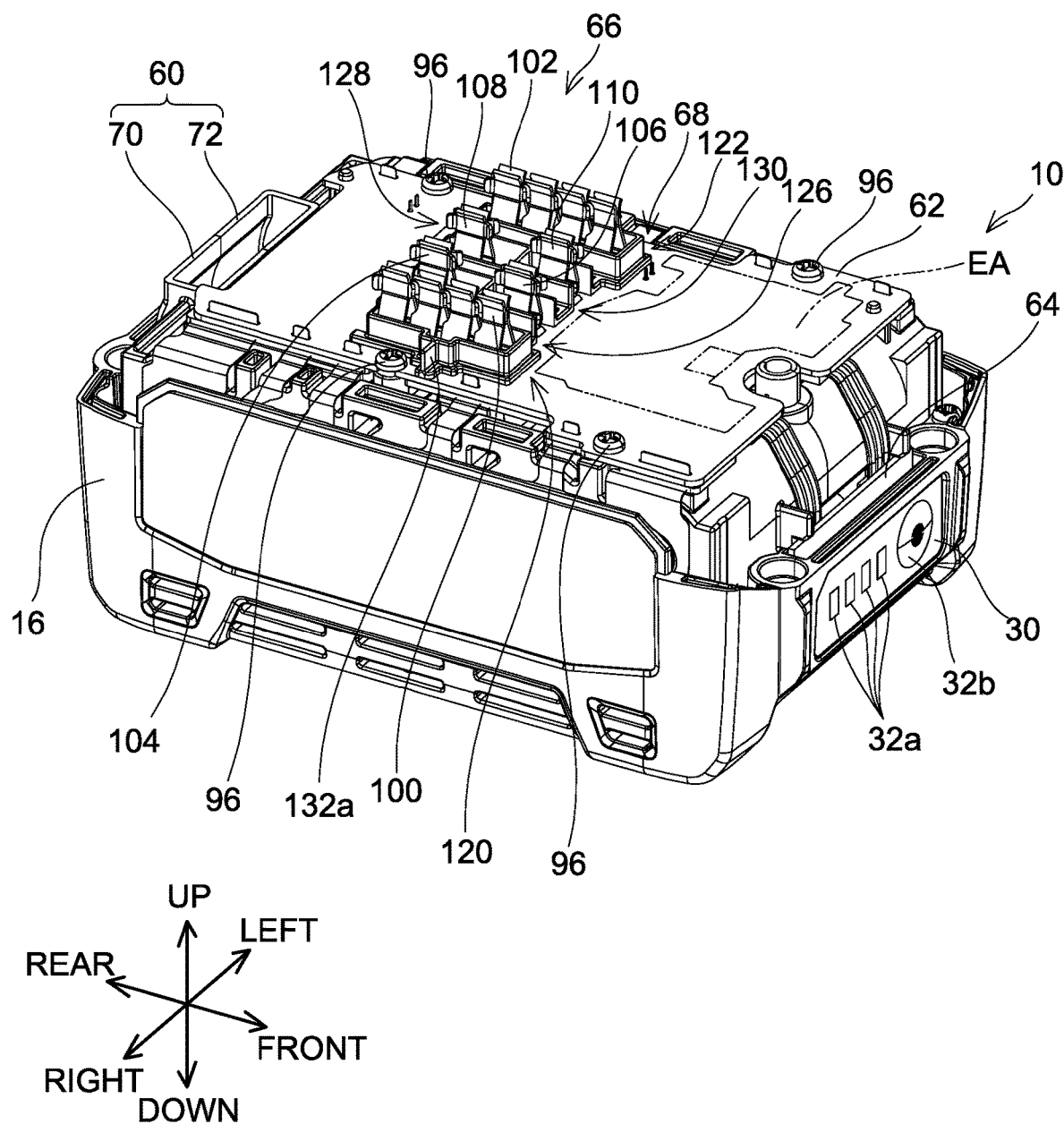
FIG. 3 is a perspective view seeing a battery module 10 and a lower case 16 from the front right upper side in the first embodiment.

A display unit 30 is arranged on a front surface of the lower case 16. The display unit 30 includes a remaining charge indicator 30a for presenting remaining charge of the battery pack 2 and a button 30b for switching on/off of indication of the remaining charge. As shown in FIG. 2, a plurality of holes 32 is defined in a bottom surface 16a of the lower case 16.

(Configuration of Battery Module 10)

Figure 5:
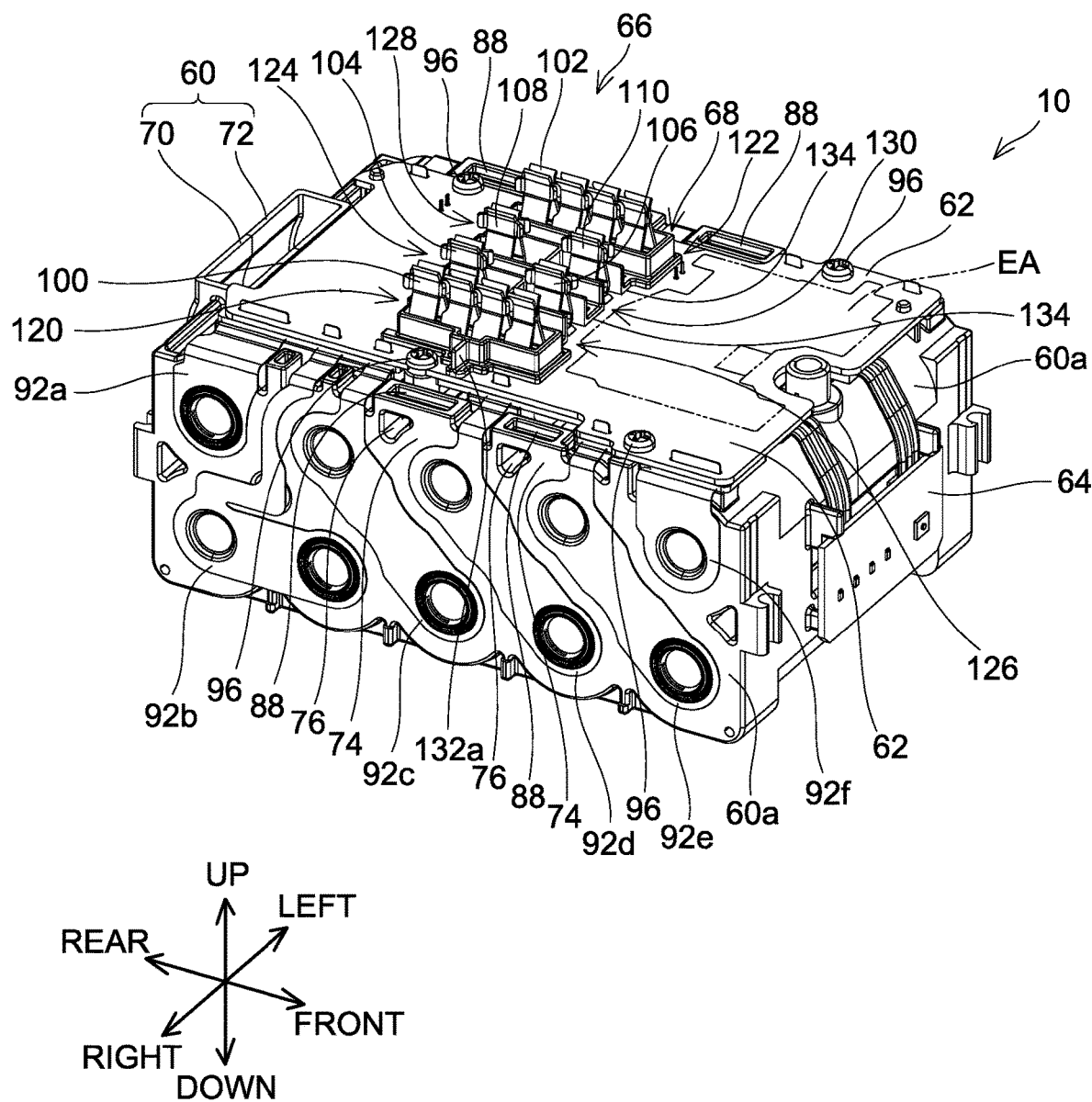
FIG. 5 is a perspective view seeing the battery module 10 of the first embodiment from the front right upper side.

As shown in FIG. 5, the battery module 10 comprises a cell case 60, a control board 62, a LED board 64, a plurality of terminals 66, and a terminal cover 68. The cell case 60 is constituted of an insulative material, and may for example be constituted of a resin material. The cell case 60 is divided into a right cell case 70 and a left cell case 72.

Figure 6:
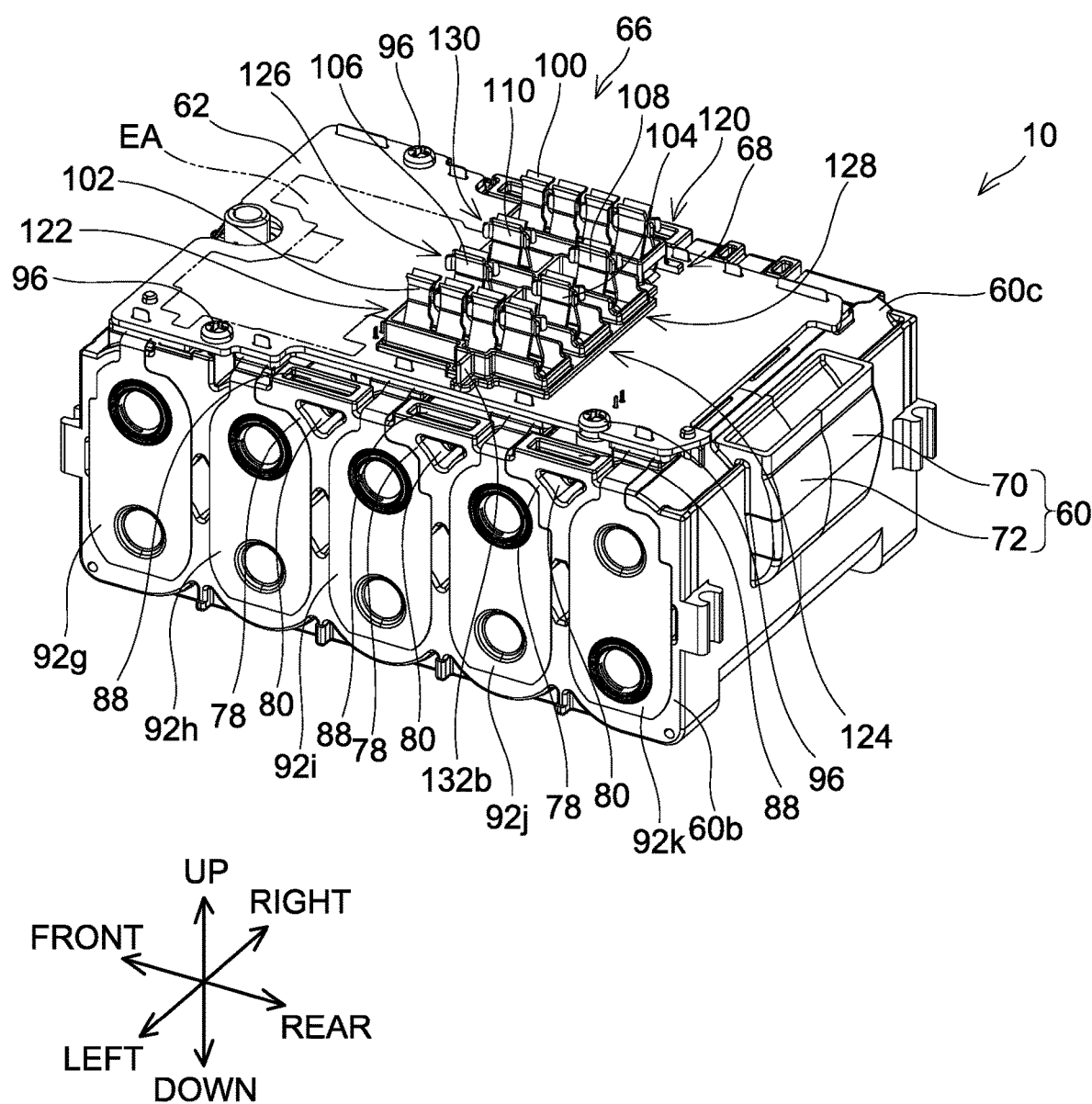
FIG. 6 is a perspective view seeing the battery module 10 of the first embodiment from rear left upper side.
Figure 7:
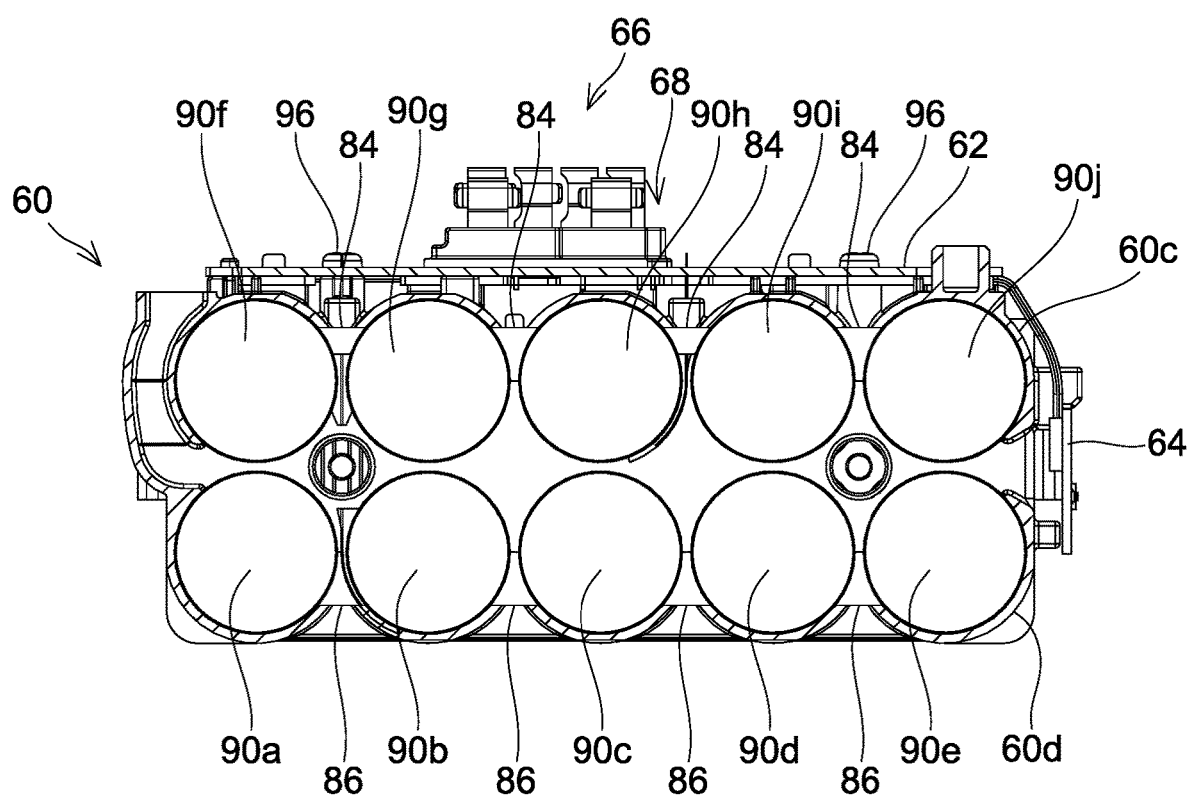
FIG. 7 is a cross-sectional view seeing the battery module 10 of the first embodiment from right.

As shown in FIG. 7, the cell case 60 has ten battery cells 90a to 90j disposed side by side therein in two vertical rows. The battery cells 90 are substantially cylindrical secondary battery cells, each having a positive electrode at one end and a negative electrode at another end, and are for example lithium ion battery cells. In the present embodiment, the battery cells 90 are type 18650 lithium ion battery cells, and their rated voltage is 3.6[V]. The battery cells 90 are disposed such that a direction from the positive electrode to the negative electrode of each battery cell 90 is opposite to that of the battery cell 90 adjacent thereto in the up-down direction. The battery cells 90a to 90e in a lower row are disposed such that the direction from the positive electrode to the negative electrode of the battery cells 90b to 90e is opposite to the direction from the positive electrode to the negative electrode of the rearmost battery cell 90a. Further, the battery cells 90f to 90j in an upper row are disposed such that the direction from the positive electrode to the negative electrode of the battery cells 90g to 90j is opposite to the direction from the positive electrode to the negative electrode of the rearmost battery cell 90f. That is, the battery cells 90a, 90g to 90j are disposed such that their direction from the positive electrode to the negative electrode is in a same direction, and the battery cells 90b to 90f are disposed such that their direction from the positive electrode to the negative electrode is in the opposite to that of the battery cells 90a, 90g to 90j. The one ends of the battery cells 90 are connected to metal lead plates 92a to 92f disposed on a right side surface of the cell case 60 (see FIG. 5), and the other ends of the battery cells 90 are connected to metal lead plates 92g to 92k disposed on a left side surface of the cell case 60 (see FIG. 6). As shown in FIG. 5, the plurality of lead plates 92a to 92f is disposed with an interval between each other. As such, the plurality of lead plates 92a to 92f is insulated from each other. Further, as shown in FIG. 6, the plurality of lead plates 92g to 92k is disposed with an interval between each other. As such, the plurality of lead plates 92g to 92k is insulated from each other. The battery cells 90 are electrically connected in series by the lead plates 92a to 92k. Due to this, the rated voltage of the battery pack 2 is 36[V]. Although not shown in the drawings, insulative sheets are adhered on a right side surface 60a and a left side surface 60b of the cell case 60.

As shown in FIG. 5, the control board 62 is disposed above the cell case 60. The control board 62 is disposed along a plane that is perpendicular to the up-down direction. The control board 62 is fixed to the cell case 60 by screws 96. In the control board 62, an element area EA (double dot chain line on the control board 62) where electronic components such as a resistance, a capacitor, and a diode are arranged is disposed in front of the plurality of terminals 66. The element area EA is given waterproof coating.

Figure 11:
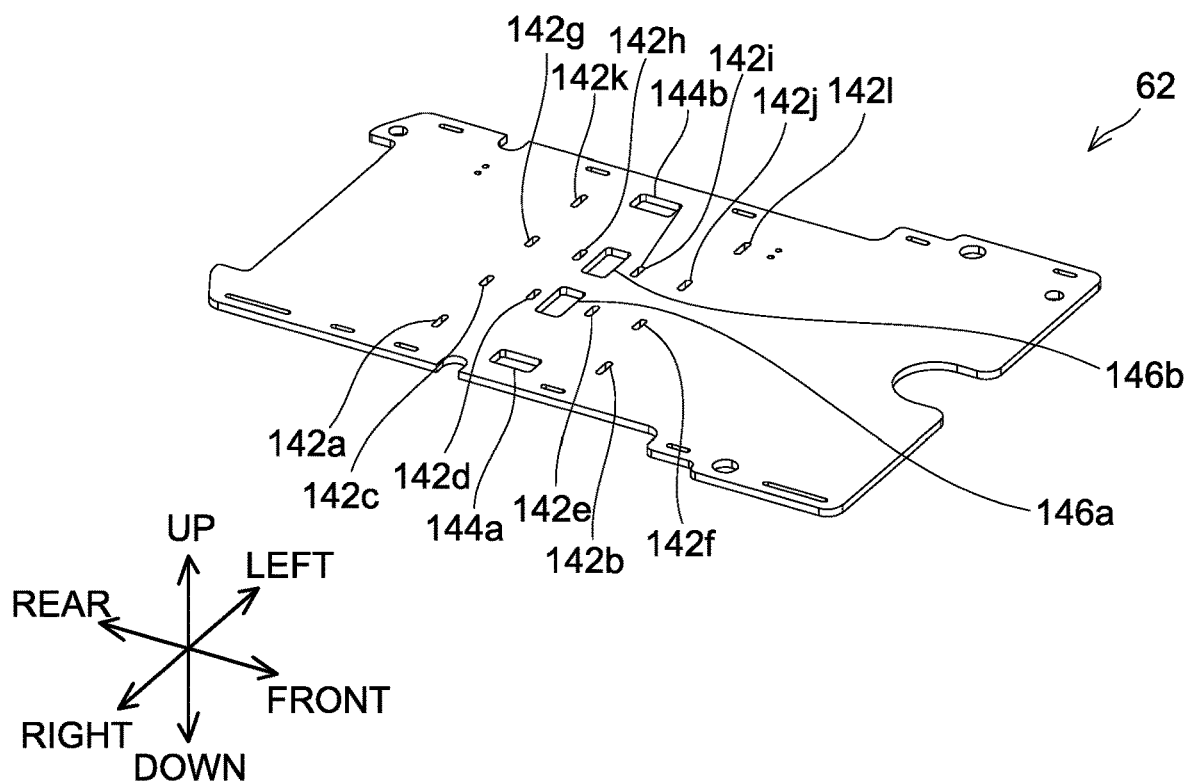
FIG. 11 is a perspective view seeing a control board 62 of the first embodiment from the front right upper side.

As shown in FIG. 11, the control board 62 includes terminal connectors 142a to 142l for connecting the plurality of terminals 66 to the control board 62. Further, the control board 62 includes board holes 144a, 144b, 146a, 146b. The board holes 144a, 144b are each located on an outer side than their corresponding one of the board holes 146a, 146b is in a left-right direction. The board hole 144a on a right end side is located on the outer side (right side) than the terminal connectors 142a, 142b located rightmost among the terminal connectors 142a to 142l are. Further, the board hole 144b on a left end side is located on the outer side (left side) than the terminal connectors 142k, 142l located leftmost among the terminal connectors 142a to 142l are. The board hole 146a is disposed between the terminal connector 142d and the terminal connector 142e. The board hole 146b is disposed between the terminal connector 142h and the terminal connector 142i. Positions of the board holes 144a, 144b, 146a, 146b in the front-rear direction substantially coincide with one another.

As shown in FIG. 5, the plurality of terminals 66 is disposed on an upper surface of the control board 62. The terminals 66 are composed of a battery-side negative electrode terminal 100 used for charging and discharging power, a battery-side positive electrode terminal 102 used for charging and discharging power, and battery-side signal terminals 104, 106, 108, 110 used for signal transmission. As will be described later, the battery-side signal terminal 110 is not used when the battery pack 2 is mounted on the power tool 200. The battery-side signal terminal 110 is used only when the battery pack 2 is mounted on a charger (omitted from drawings). In a state where the power tool 200 is attached to the battery pack 2, the battery-side negative electrode terminal 100 and the battery-side positive electrode terminal 102 function as a pair of discharging terminals. The battery-side negative electrode terminal 100 is connected to the terminal connectors 142a, 142b of the control board 62 (see FIG. 11), and the battery-side positive electrode terminal 102 is connected to the terminal connectors 142k, 142l of the control board 62 (see FIG. 11) The first battery-side signal terminal 104 is connected to the terminal connectors 142c, 142d of the control board 62 (see FIG. 11), the second battery-side signal terminal 106 is connected to the terminal connectors 142e, 142f of the control board 62 (see FIG. 11), the third battery-side signal terminal 108 is connected to the terminal connectors 142g, 142h of the control board 62 (see FIG. 11), and the fourth battery-side signal terminal 110 is connected to the terminal connectors 142i, 142j of the control board 62 (see FIG. 11).

Figure 12:
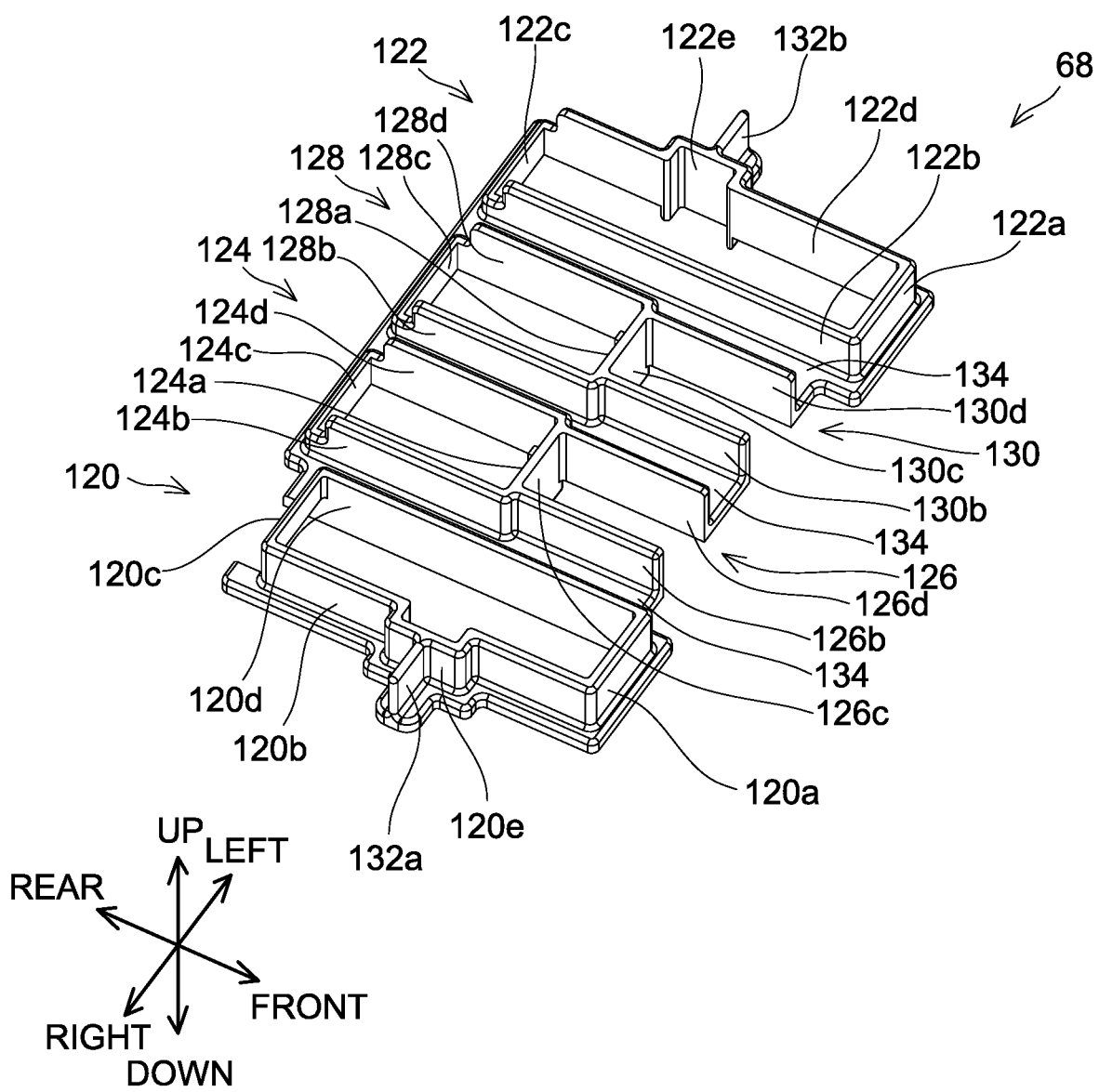
FIG. 12 is a perspective view seeing a terminal cover 68 of the first embodiment from the front right upper side.
Figure 13:
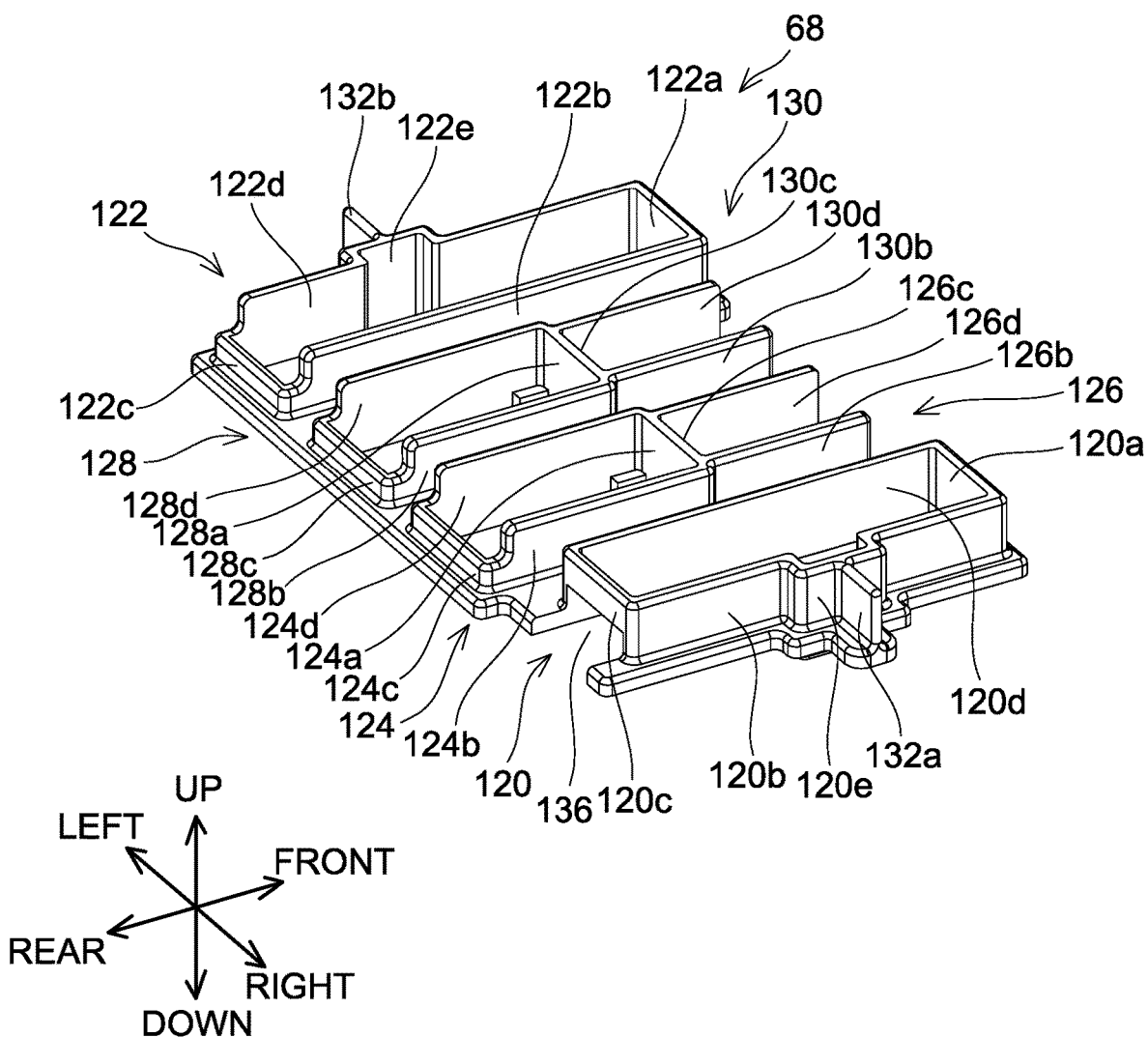
FIG. 13 is a perspective view seeing the terminal cover 68 of the first embodiment from rear right upper side.

Further, the terminal cover 68 is provided at the upper surface of the control board 62. The terminal cover 68 is constituted of semitransparent resin. The terminal cover 68 is adhered to the control board 62 by double-sided tape. When the terminal cover 68 is semitransparent, an adhered state of the terminal cover 68 on the control board 62 can easily be checked. As shown in FIG. 12, the terminal cover 68 includes six peripheral walls 120, 122, 124, 126, 128, 130, two extension walls 132a, 132b, and coupling parts 134. The peripheral wall 120 is composed of a front wall 120a, a right wall 120b, a rear wall 120c, and a left wall 120d. A protruding part 120e protruding to an outer side (right side) is disposed at a center of the right wall 120b in the front-rear direction. The extension wall 132a extends toward the outer side of (right side) from the protruding part 120e. As shown in FIG. 13, an opening 136 is defined at a lower portion of the rear wall 120c. As shown in FIG. 12, the peripheral wall 122 is composed of a front wall 122a, a right wall 122b, a rear wall 122c, and a left wall 122d. A protruding part 122e protruding to an outer side (left side) is disposed at a center of the left wall 122d in the front-rear direction. The extension wall 132b extends toward the outer side (left side) from the protruding part 122e. The peripheral wall 124 is composed of a front wall 124a, a right wall 124b, a rear wall 124c, and a left wall 124d. The peripheral wall 126 is composed of a right wall 126b, a rear wall 126c, and a left wall 126d. The peripheral wall 128 is composed of a front wall 128a, a right wall 128b, a rear wall 128c, and a left wall 128d. The peripheral wall 130 is composed of a right wall 130b, a rear wall 130c, and a left wall 130d. The front wall 124a of the peripheral wall 124 and the rear wall 126c of the peripheral wall 126 are integrated as one. Further, the front wall 128a of the peripheral wall 128 and the rear wall 130c of the peripheral wall 130 are integrated as one. A height of the rear walls 122c, 124c, 128c located rearmost within the terminal cover 68 is lower than a height of other walls. The coupling parts 134 are configured to couple the peripheral walls that are spaced apart from each other in the left-right direction. Specifically, the coupling part 134 located rightmost couples the left wall 120d of the peripheral wall 120 and the right walls 124b, 126b of the peripheral walls 124, 126. Further, the coupling part 134 located at center couples the left walls 124d, 126d of the peripheral walls 124, 126 and the right walls 128b, 130b of the peripheral walls 128, 130. Further, the coupling part 134 located leftmost couples the left walls 128d, 130d of the peripheral walls 128, 130 and the right wall 122b of the peripheral wall 122.

Figure 4:
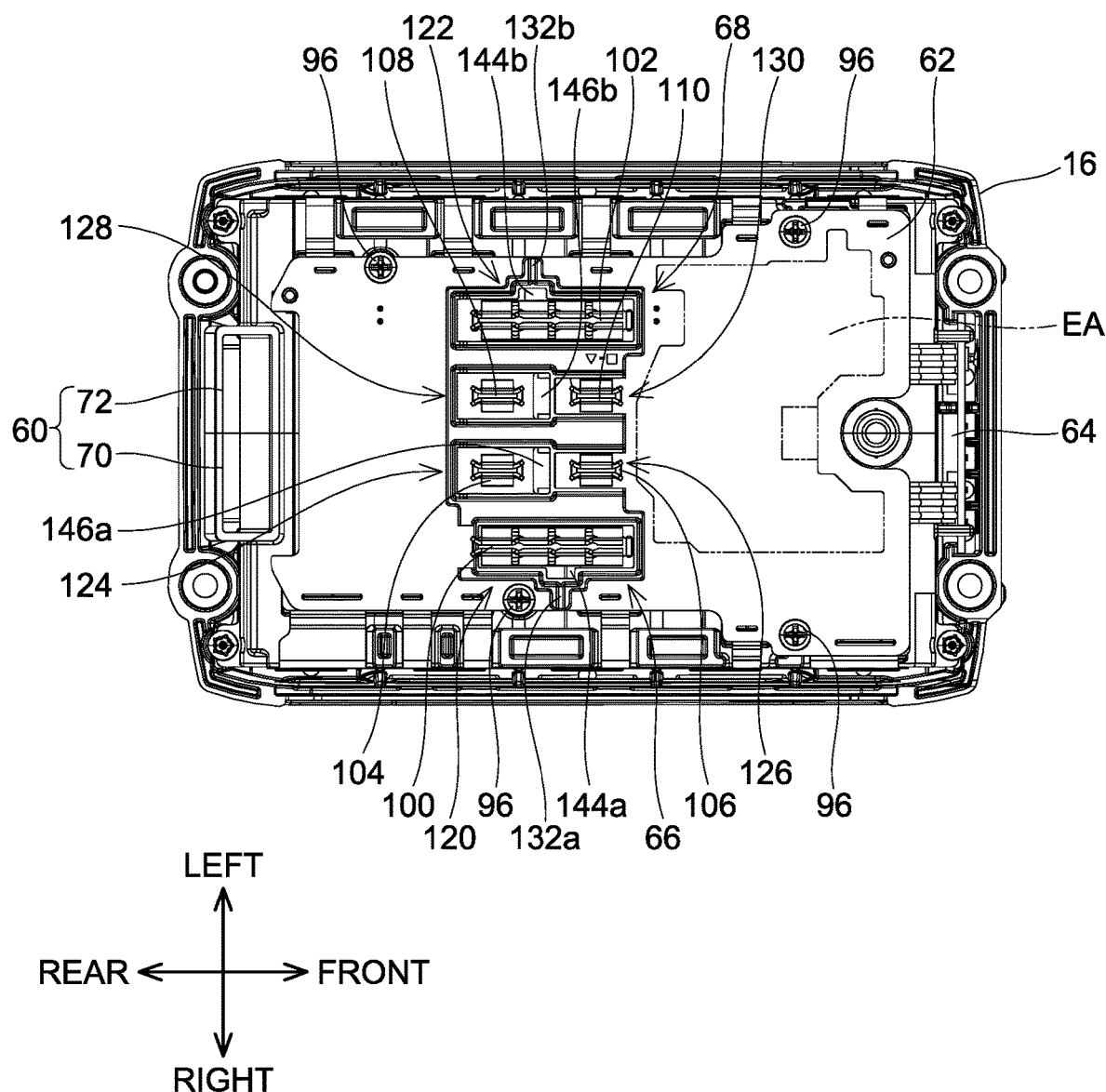
FIG. 4 is a top view seeing the battery module 10 and the lower case 16 from above in the first embodiment.

As shown in FIG. 4, in a state where the terminal cover 68 is attached to the upper surface of the control board 62, the battery-side negative electrode terminal 100 is disposed inside the peripheral wall 120. The battery-side negative electrode terminal 100 is surrounded by the peripheral wall 120 except for its rear lower portion. Further, the board hole 144a is disposed inside the protruding part 120e of the peripheral wall 120. The battery-side positive electrode terminal 102 is disposed inside the peripheral wall 122. The battery-side positive electrode terminal 102 is surrounded fully around its four sides by the peripheral wall 122. Further, the board hole 144b is disposed inside the protruding part 122e of the peripheral wall 122.

The battery-side signal terminals 104, 106, 108, 110 are disposed inside the peripheral walls 124, 126, 128, 130. The first battery-side signal terminal 104 is surrounded fully around its four sides by the peripheral wall 124. Further, the board hole 146a is disposed inside the peripheral wall 124 and in front of the first battery-side signal terminal 104. The second battery-side signal terminal 106 is surrounded by the peripheral wall 126 except for its front side. The third battery-side signal terminal 108 is surrounded fully around its four sides by the peripheral wall 128. Further, the board hole 146b is disposed inside the peripheral wall 128 and in front of the third battery-side signal terminal 108. The fourth battery-side signal terminal 110 is surrounded by the peripheral wall 130 except for its front side.

Figure 15:
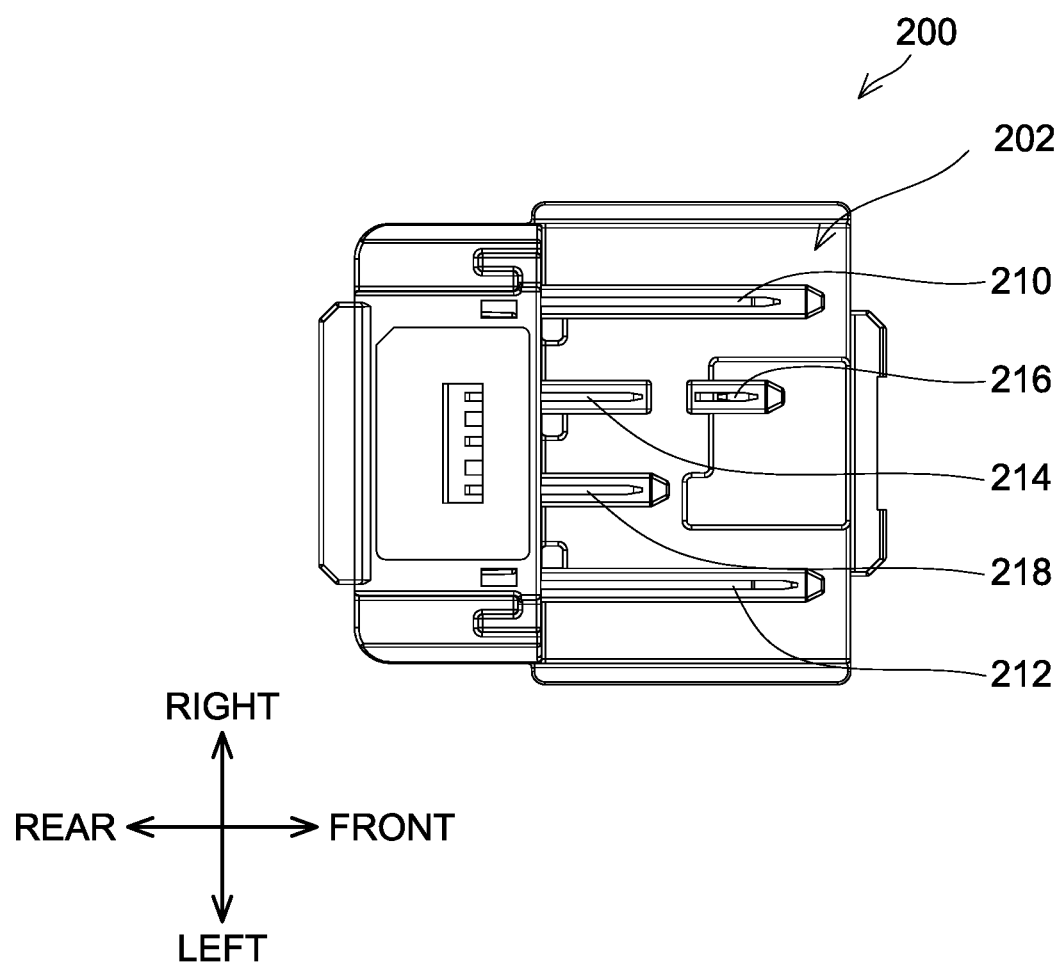
FIG. 15 is a bottom view seeing a terminal unit 202 of the power tool 200 from below.

As mentioned above, among the plurality of terminals 66 disposed on the control board 62, the battery-side negative electrode terminal 100, the battery-side positive electrode terminal 102, and the battery-side signal terminals 104, 106, 108 are connected to the terminal unit 202 of the power tool 200 (see FIG. 15), however, the fourth battery-side signal terminal 110 is not connected to the terminal unit 202 of the power tool 200. This is because as shown in FIG. 15, the terminal unit 202 of the power tool 200 includes a tool-side negative electrode terminal 210 corresponding to the battery-side negative electrode terminal 100, a tool-side positive electrode terminal 212 corresponding to the battery-side positive electrode terminal 102, a first tool-side signal terminal 214 corresponding to the first battery-side signal terminal 104, a second tool-side signal terminal 216 corresponding to the second battery-side signal terminal 106, and a third tool-side signal terminal 218 corresponding to the third battery-side signal terminal 108, however, it does not include a tool-side signal terminal corresponding to the fourth battery-side signal terminal 110. The terminal cover 68 is configured to separate, among the plurality of terminals 66, the terminals that are connected to the terminal unit 202 of the power tool 200. As shown in FIG. 4, the battery-side positive electrode terminal 102, the first battery-side signal terminal 104, and the third battery-side signal terminal 108 are surrounded fully around their four sides by the peripheral walls 122, 124, 128, thus are separated from other terminals. However, as for the battery-side negative electrode terminal 100, the opening 136 is defined at the lower portion of the rear wall 120c of the peripheral wall 120. Further, as for the second battery-side signal terminal 106, the peripheral wall 126 does not have a front wall. Due to this, if the extension walls 132a, 132b are not provided, water that adhered to the upper surface of the control board 62 could enter through the opening 136, flow around the outer side of the peripheral wall 120 or the peripheral wall 122, and reach the peripheral wall 126. This brings forth a risk that the battery-side negative electrode terminal 100 and the second battery-side signal terminal 106 short-circuit via the water. In order to avoid such a situation, the terminal cover 68 includes the extension walls 132a, 132b. A right end of the extension wall 132a substantially matches a right end of the control board 62, and a left end of the extension wall 132b substantially matches a left end of the control board 62. Due to this, the extension walls 132a, 132b suppress water from flowing from front to rear side and from rear to front side of the control board 62. Due to this, when the water that adhered to the upper surface of the control board 62 passes through the opening 136, flows around the outer side of the peripheral wall 120, and reaches the extension wall 132a, the water is inhibited from flowing forward by the extension wall 132a. Specifically, the water flows out to the right of the control board 62, that is, onto an upper surface 60c of the cell case 60. Thus, the battery-side negative electrode terminal 100 and the second battery-side signal terminal 106 can be said as being separated by the peripheral wall 120, peripheral wall 126, and the extension walls 132a, 132b.

Figure 8:
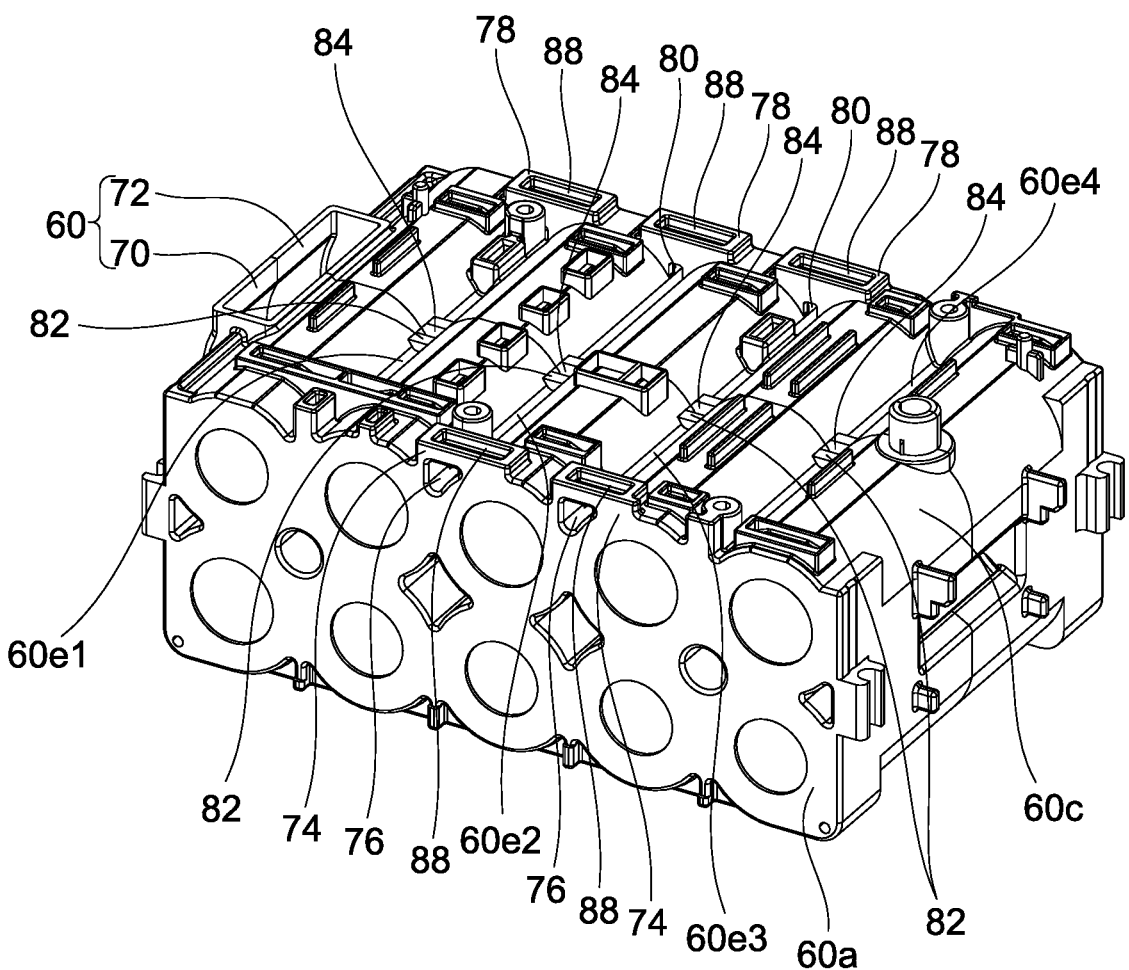
FIG. 8 is a perspective view seeing a cell case 60 of the first embodiment from the front right upper side.
Figure 8:
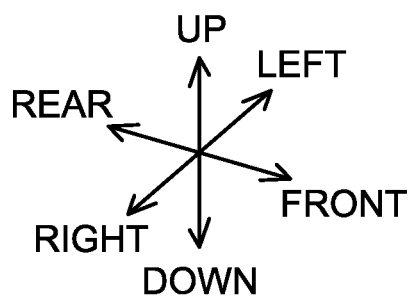

As shown in FIG. 8, the cell case 60 is divided into the right cell case 70 and the left cell case 72. The upper surface 60c of the cell case 60 has a shape corresponding to longitudinal side surfaces of the battery cells 90. Protruding parts 74 protruding upward than the upper surface 60c of the cell case 60 are arranged at an upper portion of the right side surface 60a of the cell case 60. The protruding parts 74 are each disposed to traverse over two adjacent battery cells 90. The protruding parts 74 each have a case hole 76 penetrating the protruding part 74 in the left-right direction. As shown in FIG. 6, protruding parts 78 protruding upward than the upper surface 60c of the cell case 60 are arranged at an upper portion of the left side surface 60b of the cell case 60. The protruding parts 78 are each disposed to traverse over two adjacent battery cells 90. The protruding parts 78 each have a case hole 80 penetrating the protruding part 78 in the left-right direction. The protruding parts 74, 78 each have a depressed portion 88. The depressed portions 88 have a shape corresponding to projections (omitted from drawings) arranged on a back side of the upper surface 14a of the upper case 14. When the upper case 14 and the cell case 60 are connected, the projections on the upper case 14 are received in the depressed portions 88 in the cell case 60. Due to this, even when a positional displacement occurs between the upper case 14 and the lower case 16 due to an impact from the power tool 200 having the battery pack 2 mounted thereon (see FIG. 14) being dropped, a positional displacement can be suppressed from occurring between the upper case 14 and the cell case 60. Thus, the upper case 14 can be suppressed from contacting the control board 62 that is fixed to the cell case 60. That is, the protruding parts 74, 78 and the depressed portions 88 are provided to suppress the positional displacement between the upper case 14 and the lower case 16.

Figure 9:
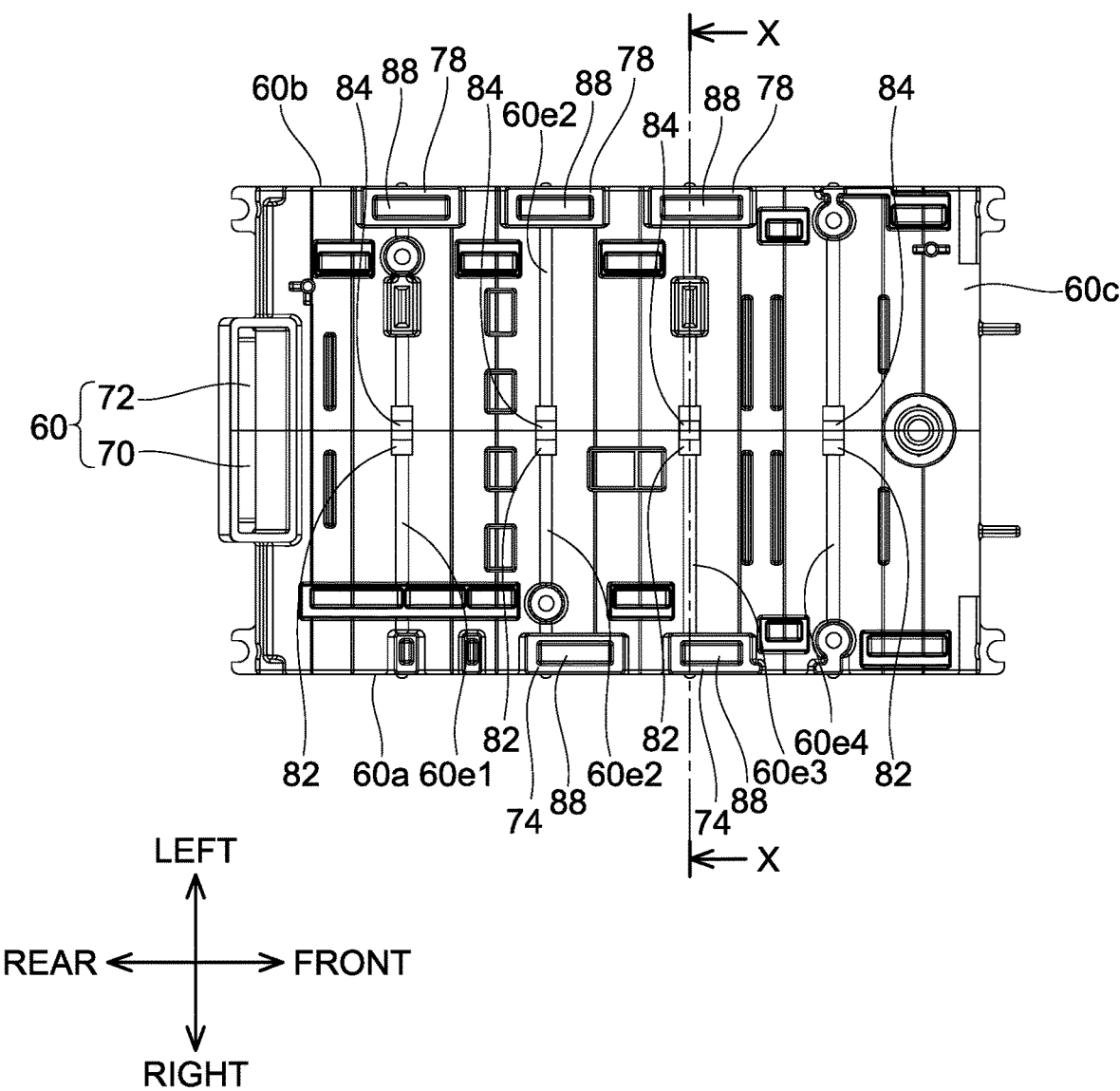
FIG. 9 is a top view seeing the cell case 60 of the first embodiment from above.
Figure 10:
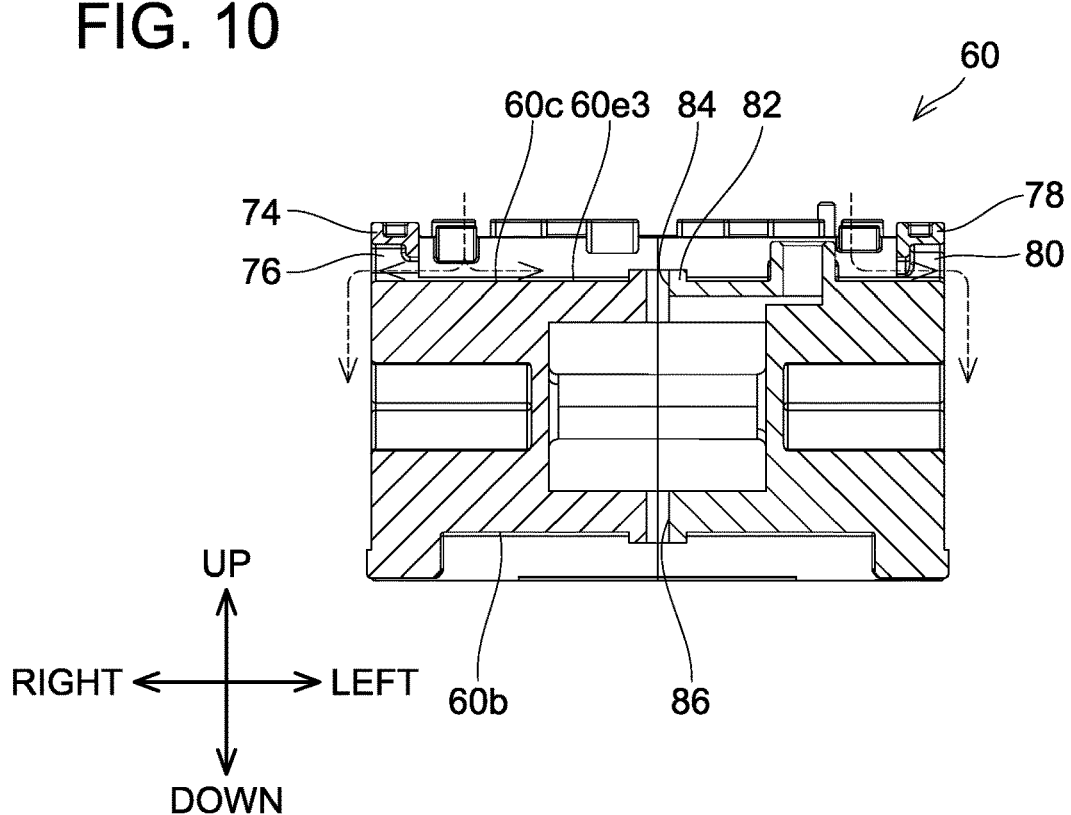
FIG. 10 is a cross-sectional view seeing the cell case 60 from front in the first embodiment.

As shown in FIG. 9, cavities 60e1 to 60e4 are defined in the upper surface 60c of the cell case 60 between each pair of adjacent battery cells 90. Protruding parts 82 that protrude upward than the upper surface 60c are arranged in the cavities 60e1 to 60e4. The protruding parts 82 are arranged at a center of the cell case 60 in the left-right direction. Each protruding part 82 has a case hole 84 penetrates through the protruding part 82 in the up-down direction. Further, as shown in FIG. 10, case holes 86 are defined in a lower surface 60d of the cell case 60 at positions opposed to the case holes 84.

Next, a drain passage in a case where water that entered into the outer case 12 from the terminal openings 22a or the like flows through the board holes 144a, 144b, 146a, 146b of the control board 62 and reaches the upper surface 60c of the cell case 60 will be described with reference to FIGS. 4, 9, and 10. The water that reached the upper surface 60c of the cell case 60 is collected in the cavities 60e1 to 60e4 in the upper surface 60c of the cell case 60. As the water is collected in the cavities 60e1 to 60e4, the water flows out to the lower case 16 side through the case holes 84 in the upper surface 60c of the cell case 60 and the case holes 86 in the lower surface 60d of the cell case 60. The water that flowed out to the lower case 16 reaches the bottom surface 16a of the lower case 16, and is drained to outside from the holes 32 in the bottom surface 16*a* (see FIG. 2). Most of the water flowing through the board holes 144*a*, 144*b*, 146*a*, 146*b* of the control board 62 is collected in the cavities 60*e*2, 60*e*3. As it is collected in the cavities 60*e*2, 60*e*3, the water flows out to the lower case 16 through the case holes 76 defined in the protruding parts 74 and the case holes 80 defined in the protruding parts 78 of the cell case 60. The water that flowed out to the lower case 16 reaches the bottom surface 16*a* of the lower case 16 and is drained to the outside from the holes 32 in the bottom surface 16*a* (see FIG. 2). As such, draining performance of the upper surface 60*c* of the cell case 60 is increased by the case holes 76 of the right side surface 60*a* and the case holes 80 of the left side surface 60*b* of the cell case 60.

In one or more aspects, as shown in FIGS. 1 to 13, the battery pack 2 comprises: the battery cells 90; the control board 62 disposed above the battery cells 90 and connected to the battery cells 90; the plurality of terminals 66 disposed on the control board 62 and disposed side by side in the left-right direction; the plurality of right walls 120*b*, 122*b*, 124*b*, 126*b*, 128*b*, 130*b* disposed on the control board 62; the plurality of left walls 120*d*, 122*d*, 124*d*, 126*d*, 128*d*, 130*d* disposed on the control board 62; and the outer case 12 having the upper surface 14*a* comprising the terminal reception part 22 configured to receive the terminal unit 202 of the power tool 200. At least two walls are disposed between two terminals adjacent in the left-right direction (for example, between the battery-side negative electrode terminal 100 and the third battery-side signal terminal 108). According to the above configuration, a long creepage distance between the two terminals adjacent in the left-right direction can be set longer than in a case where there is only one wall or no wall. Due to this, even when water entered into the outer case 12, the terminals adjacent in the left-right direction can be suppressed from being short-circuited.

(Corresponding Relationship)

The plurality of right walls 120*b*, 122*b*, 124*b*, 126*b*, 128*b*, 130*b* and the plurality of left walls 120*d*. 122*d*, 124*d*, 126*d*, 128*d*, 130*d* are examples of "plurality of partition walls". The battery-side negative electrode terminal 100, the battery-side positive electrode terminal 102, and the battery-side signal terminals 104, 106, 108, 110 are examples of "first terminal". The battery-side negative electrode terminal 100, the battery-side positive electrode terminal 102, and the battery-side signal terminals 104, 106, 108, 110 are examples of "second terminal".

In one or more aspects, as shown in FIGS. 1 to 13, the battery pack 2 comprises: the battery cells 90; the control board 62 disposed above the battery cells 90 and connected to the battery cells 90; the plurality of terminals 66 disposed on the control board 62; the peripheral walls 122, 124, 128 disposed on the control board 62 and surrounding the periphery of one terminal among the plurality of terminals 66; and the outer case 12 having the upper surface 14*a* comprising the terminal reception part 22 configured to receive the terminal unit 202 of the power tool 200. The board holes 144*b*, 146*a*, 146*b* are defined in the control board 62 that is inside the peripheral walls 122, 124, 128. According to the above configuration, a creepage distance between the battery-side positive electrode terminal 102, the first battery-side signal terminal 104, and the third battery-side signal terminal 108 surrounded by the peripheral walls 122, 124, 128 and the other terminals can be set longer than in a case where the peripheral walls 122, 124, 128 are not disposed. Further, since the board holes 144*b*, 146*a*, 146*b* are defined on the control board 62 on the inside of the peripheral walls 122, 124, 128, water does not stay inside the peripheral walls 122, 124, 128. Due to this, the water that has been collected inside the peripheral walls 122, 124, 128 can be suppressed from overflowing to the outside of the peripheral walls 122, 124, 128 and the terminals 102, 104, 108 surrounded by the peripheral walls 122, 124, 128 can be suppressed from short-circuiting with the other terminals via the water.

In one or more aspects, as shown in FIGS. 5 to 10, the battery pack 2 comprises: the cell case 60 housed inside the outer case 12, holding the ten battery cells 90, and disposed below the control board 62. The ten battery cells 90 are disposed parallel to the bottom surface 16*a* of the outer case 12, and the case holes 76, 80, 84, 86 are defined in the cell case 60 between the pairs of adjacent battery cells 90. The water drained from the board holes 144*b*, 146*a*, 146*b* of the control board 62 reaches the upper surface 60*c* of the cell case 60. According to the above configuration, the water that reached the upper surface 60*c* of the cell case 60 flows out to the bottom surface 16*a* of the outer case 12 through the case holes 76, 80, 84, 86 defined in the cell case 60. As such, the water can be guided to a position lower than the control board 62 and the battery cells 90.

In one or more aspects, as shown in FIG. 10, the cell case 60 comprises: the case holes 84 disposed in the cavities 60*e*1 to 60*e*4 of the upper surface 60*c* of the cell case 60 between the pairs of adjacent battery cells 90 and penetrating through the cell case 60 in the up-down direction; and the case holes 86 disposed at the positions opposed to the case holes 84 in the lower surface 60*d* of the cell case 60 and penetrating through the cell case 60 in the up-down direction. According to the above configuration, the water that reached the cavities 60*e*1 to 60*e*4 of the upper surface 60*c* of the cell case 60 enter into the cell case 60 through the case holes 84 defined in the cavities 60*e*1 to 60*e*4 of the upper surface 60*c* of the cell case 60, reaches around the case holes 86 defined in the lower surface 60*d* of the cell case 60, flows out to the outer case 12 through the case holes 84, and reaches the bottom surface 16*a* of the outer case 12. As such, the water can be guided to a position lower than the control board 62 and the battery cells 90.

In one or more aspects, as shown in FIGS. 5 to 10, the protruding parts 74, 78 extending upward are disposed at longitudinal ends of the battery cells 90 on the upper surface 60*c* of the cell case 60 between the pairs of adjacent battery cells 90. The protruding parts 74, 78 comprise the case holes 76, 80 penetrating through the cell case 60 in the longitudinal direction of the battery cells 90. According to the above configuration, the water that reached the upper surface 60*c* of the cell case 60 flow along the upper surface 60*c* of the cell case 60 and reaches the case holes 76, 80 defined in the protruding parts 74, 78, and flows out to the bottom surface 16*a* of the outer case 12 through the case holes 76, 80. As such, the water can be guided to a position lower than the control board 62 and the battery cells 90.

(Corresponding Relationship)

The peripheral walls 122, 124, 128 are examples of "first partition wall". The case holes 84 are examples of "first case hole". The case holes 86 are examples of "second case hole". The case holes 76, 80 are examples of "third case hole". The battery-side positive electrode terminal 102 and the battery-side signal terminals 104, 108 are examples of "first terminal".

In one or more aspects, as shown in FIGS. 1 to 13, the battery pack 2 comprises: the battery cells 90; the control board 62 disposed above the battery cells 90 and connected to the battery cells 90; the plurality of terminals 66 disposed on the control board 62; one or more walls disposed on the control board 62; and the outer case 12 having the upper surface comprising the terminal reception part 22 configured to receive the terminal unit 202 of the power tool 200. The plurality of terminals 66 includes the battery-side negative electrode terminal 100, the battery-side positive electrode terminal 102, and the battery-side signal terminals 104, 106, 108. The left wall 120d and the right wall 126b extending in the front-rear direction are disposed between the battery-side negative electrode terminal 100 and the second battery-side signal terminal 106 that are adjacent to each other in the left-right direction on the frontmost side, and the front wall 120a extending in the left-right direction is disposed in front of the battery-side negative electrode terminal 100 only. According to the above configuration, a creepage distance between the battery-side negative electrode terminal 100 and the second battery-side signal terminal 106 in the left-right direction can be set long by the left wall 120d and the right wall 126b. Further, a creepage distance for a case where water flows around the left wall 120d and the right wall 126b between the battery-side negative electrode terminal 100 and the second battery-side signal terminal 106 can be set long by the front wall 120a. As such, in the event where water enters into the outer case 12, the battery-side negative electrode terminal 100 and the second battery-side signal terminal 106 that are adjacent to each other on the frontmost side can be suppressed from short-circuiting.

Further, of the battery-side negative electrode terminal 100 and the second battery-side signal terminal 106 adjacent to each other on the frontmost side, the front wall 120a is disposed in front of the battery-side negative electrode terminal 100 while no wall is disposed in front of the second battery-side signal terminal 106. Due to this, an area within the control board 62 that can be used as the element area EA can be increased as compared to a case where walls are disposed in front of both the battery-side negative electrode terminal 100 and the second battery-side signal terminal 106 adjacent to each other on the frontmost side In one or more aspects, as shown in FIG. 4, the board holes 144a, 144b are defined on the outer sides of the battery-side negative electrode terminal 100 and the battery-side positive electrode terminal 102 disposed on the outermost sides in the left-right direction. According to the above configuration, water can be suppressed from being collected around the battery-side negative electrode terminal 100 and the battery-side positive electrode terminal 102. Further, as compared to a case where board holes are defined in the control board 62 in front of the battery-side negative electrode terminal 100 and in front of the battery-side positive electrode terminal 102, an area within the control board 62 that can be used as the element area EA can be increased.

In one or more aspects, as shown in FIG. 4, the board hole 146a is defined in the control board 62 between two battery-side signal terminals 104, 106 adjacent to each other in the front-rear direction. According to the above configuration, as compared to a case of defining respective board holes in the control board 62 in front of each of the two battery-side signal terminals 104, 106 adjacent to each other in the front-rear direction, an area within the control board 62 that can be used as the element area EA can be increased.

(Corresponding Relationship)

The battery-side negative electrode terminal 100 and the second battery-side signal terminal 106 are an example of "the (front) power terminal and the (front) signal terminal that are disposed side by side at the frontmost side". The battery-side negative electrode terminal 100 is an example of "first power terminal". The second battery-side signal terminal 106 is an example of "first signal terminal". The left wall 120d and the right wall 126b are examples of "first front-rear directional partition wall". The front wall 120a is an example of "left-right directional partition wall". The battery-side negative electrode terminal 100 and the battery-side positive electrode terminal 102 are examples of "terminal disposed at an outermost side in the left-right direction". The battery-side signal terminals 104, 106 are an example of "two terminals adjacent to each other in the front-rear direction". The board holes 144a, 144b are examples of "first board hole". The board holes 146a, 146b are examples of "second board hole".

In one or more aspects, as shown in FIGS. 1 to 13, the battery pack 2 comprises: the battery cells 90; the control board 62 disposed above the battery cells 90 and connected to the battery cells 90; the plurality of terminals 66 disposed on the control board 62; the peripheral walls 120, 122, 124, 126, 128 disposed on the control board 62; the extension walls 132a, 132b disposed on the control board 62; and the outer case 12 having the upper surface 14a comprising the terminal reception part 22 configured to receive the terminal unit 202 of the power tool 200. According to the above configuration, all of the terminals 100, 102, 104, 106, 108 connected to the terminal unit 202 of the power tool 200 among the plurality of terminals 66 are partitioned from the other terminals by at least one wall. Due to this, creepage distances between the plurality of terminals 66 can be set long. Thus, the terminals inside the outer case 12 can be suppressed from short-circuiting in the event where water enters into the outer case 12.

In one or more aspects, as shown in FIG. 12, the height of the rear walls 122c, 124c, 128c located rearmost is lower than the height of the rear walls 120c, 126c located more on the front side than the rear walls 122c, 124c, 128c are. According to the above configuration, the rear walls 122c, 124c, 128c can be left contact-free from the terminal unit 202 of the power tool 200 or the like when the battery pack 2 is mounted on the power tool 200, and the creepage distances between the terminals can be secured to suppress the terminals connected to the terminal unit 202 of the power tool 200 from being short-circuited.

(Corresponding Relationship)

The battery-side negative electrode terminal 100 and the battery-side positive electrode terminal 102 are examples of "power terminals". The peripheral walls 120, 122, 124, 126, 128 and the extension walls 132a, 132b of the terminal cover 68 are examples of "partition walls". The rear walls 122c, 124c, 128c are examples of "first left-right directional partition wall". The rear walls 120c, 126c are examples of "second left-right directional partition wall".

Second Embodiment

Points that differ from the battery pack 2 of the first embodiment will be described with reference to FIGS. 16 to 18. Hereinbelow, configurations that are same between embodiments will be given same reference signs and description thereof will be omitted. A battery pack 2 of a second embodiment differs in a structure of its terminal cover 368 from the structure of the terminal cover 68 of the battery pack 2 of the first embodiment.

Figure 17:
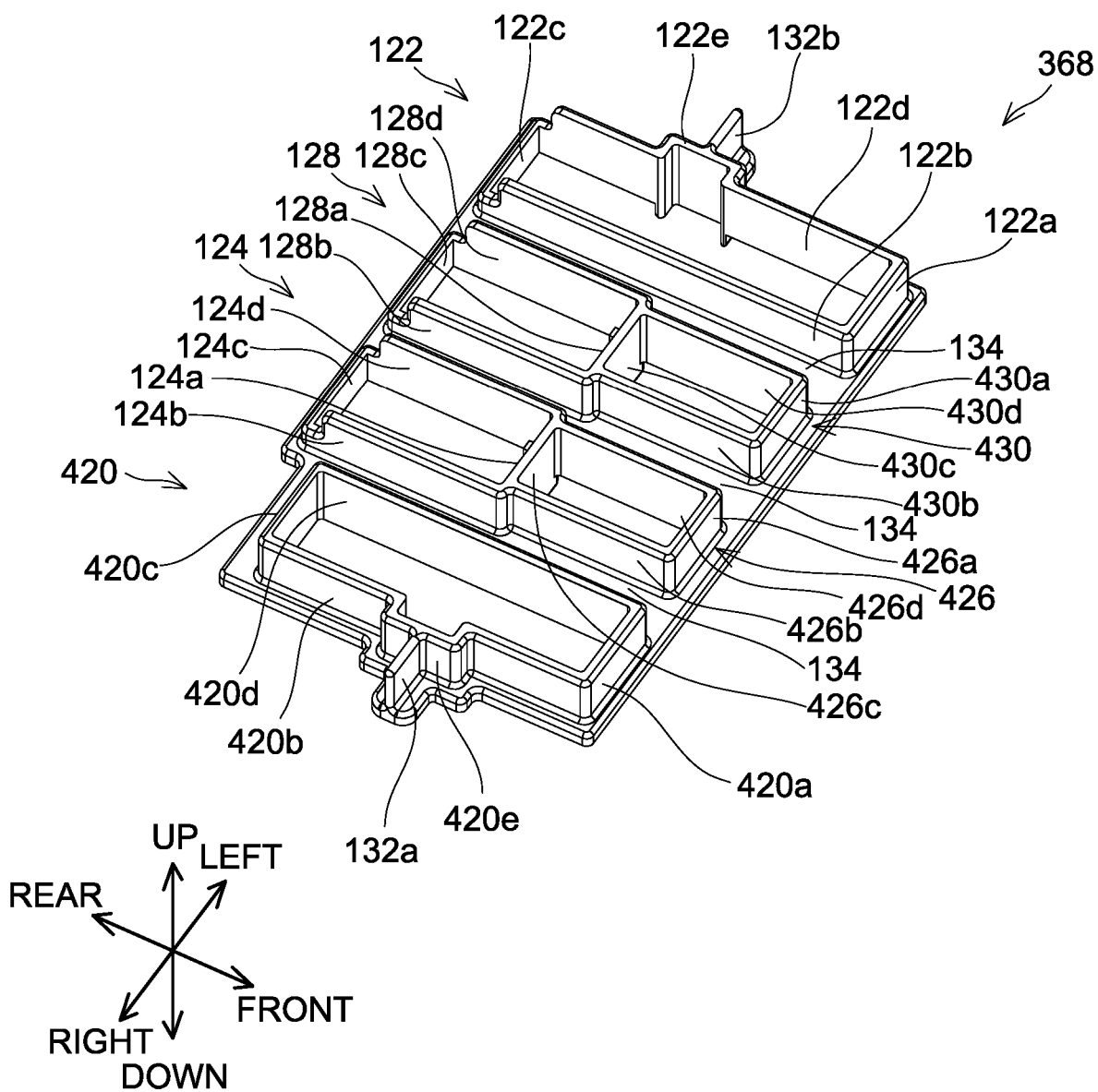
FIG. 17 is a perspective view seeing a terminal cover 368 of the second embodiment from the front right upper side.
Figure 18:
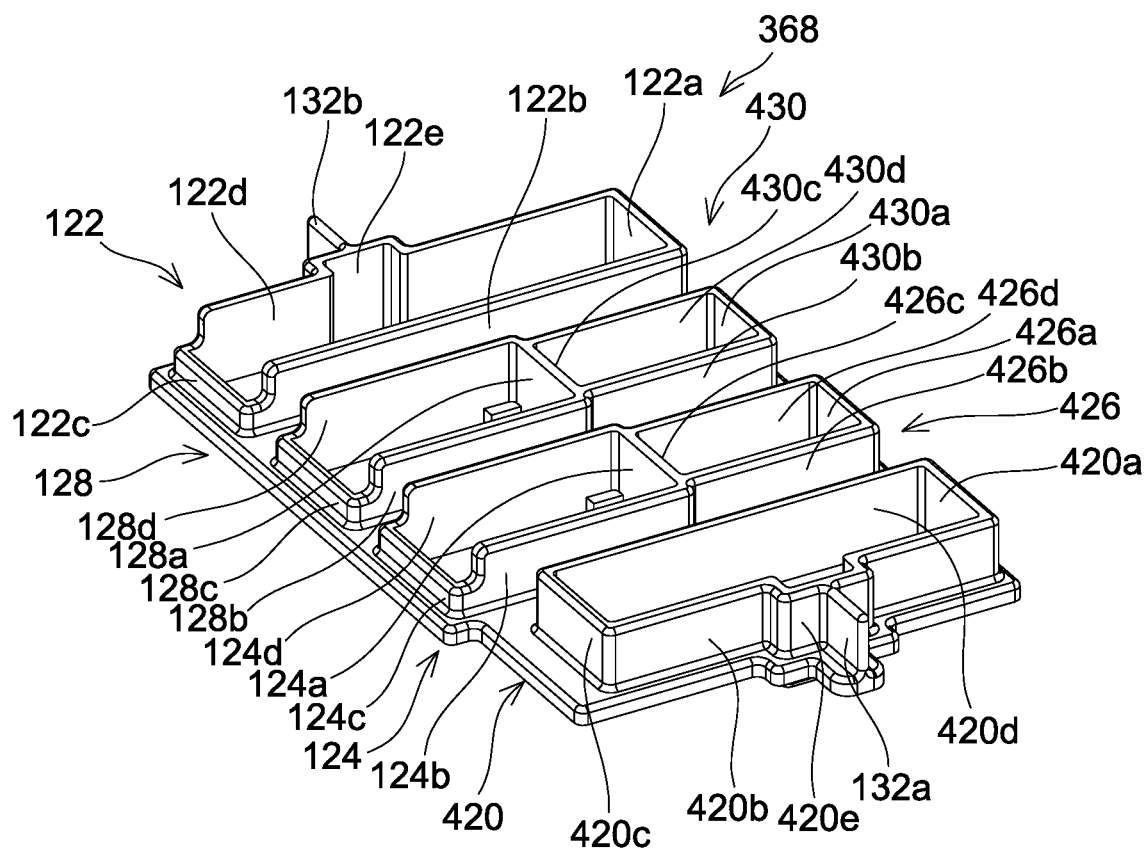
FIG. 18 is a perspective view seeing the terminal cover 368 of the second embodiment from the rear right upper side.

As shown in FIG. 17, the terminal cover 368 includes six peripheral walls 420, 122, 124, 426, 128, 430, two extension walls 132a, 132b, and coupling parts 134. The peripheral wall 420 is composed of a front wall 420a, a right wall 420b, a rear wall 420c, and a left wall 420d. A protruding part 420e protruding to the outer side (right side) is disposed at a center of the right wall 420b in the front-rear direction. As shown in FIG. 18, in the present embodiment, no opening is defined at a lower portion of the rear wall 420c. As shown in FIG. 17, the peripheral wall 426 is composed of a front wall 426a, a right wall 426b, a rear wall 426c, and a left wall 426d. Further, the peripheral wall 430 is composed of a front wall 430a, a right wall 430b, a rear wall 430c, and a left wall 430d.

Figure 16:
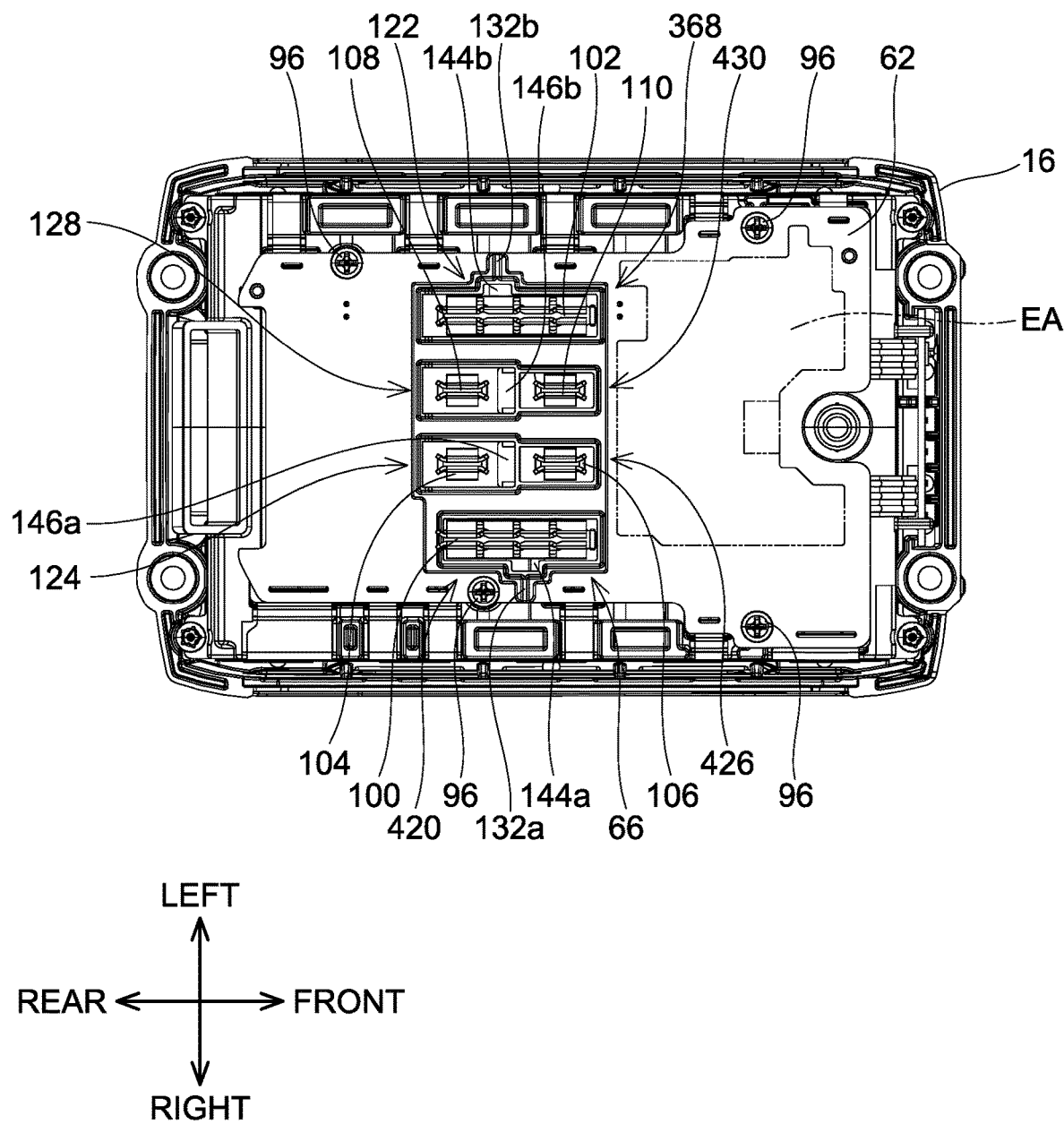
FIG. 16 is a top view seeing a battery module 10 and a lower case 16 from above in a second embodiment.

As shown in FIG. 16, in a state where the terminal cover 368 is attached to the upper surface of the control board 62, each of the terminals 100, 102, 104, 106, 110 is surrounded fully around its four sides by its corresponding one(s) of the peripheral walls 420, 122, 124, 426, 128, 430. With such a configuration as well, same effects as those of the battery pack 2 of the first embodiment can be achieved. In a variant, the terminal cover 368 may not include the extension walls 132a, 132b.

Third Embodiment

Points that differ from the battery pack 2 of the first embodiment will be described with reference to FIGS. 19 to 21. A battery pack 2 of a third embodiment differs in structures of its control board 562 and terminal cover 568 from the structures of the control board 62 and the terminal cover 68 of the battery pack 2 of the first embodiment.

Figure 20:
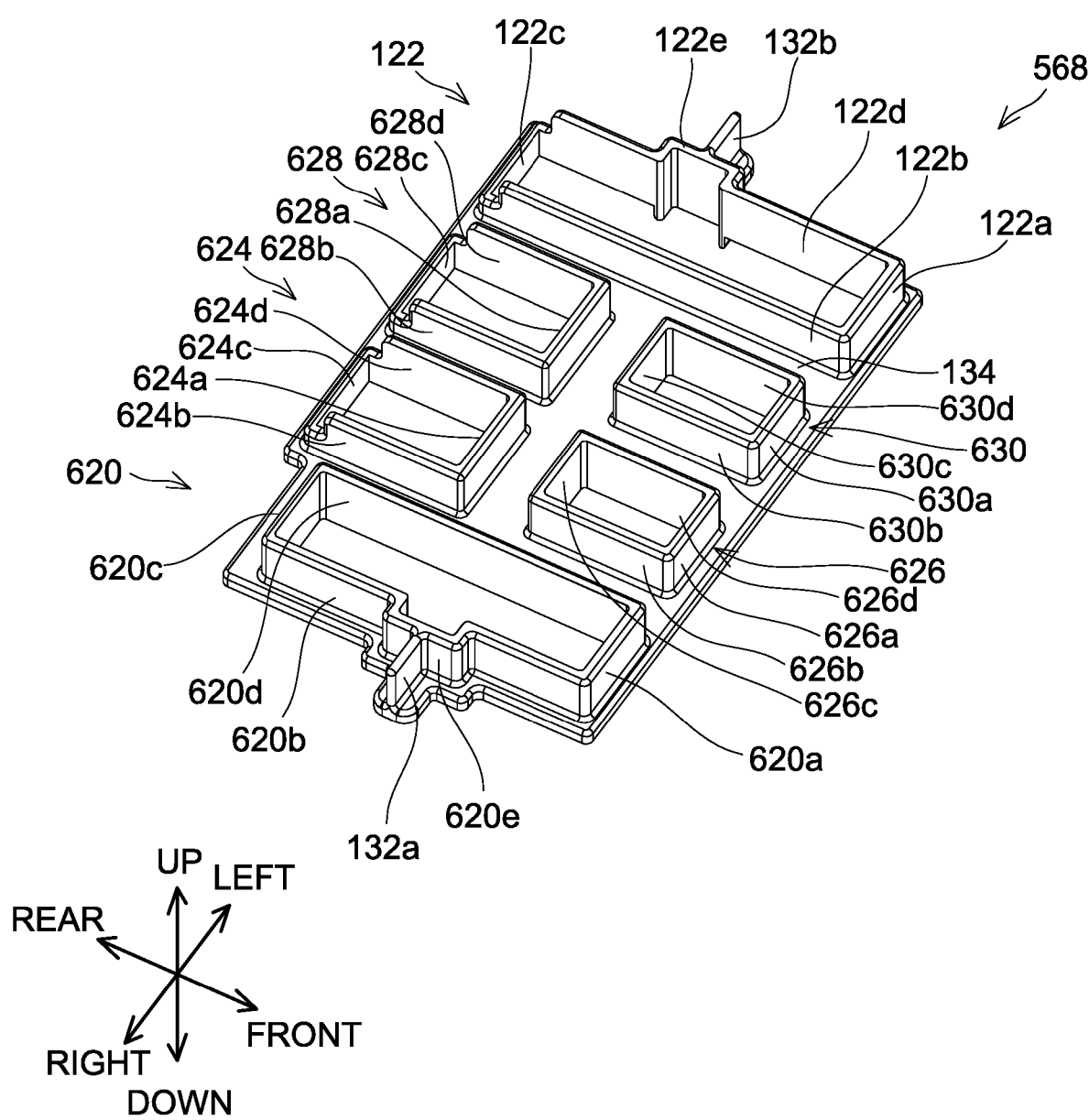
FIG. 20 is a perspective view seeing a terminal cover 568 of the third embodiment from the front right upper side.
Figure 21:
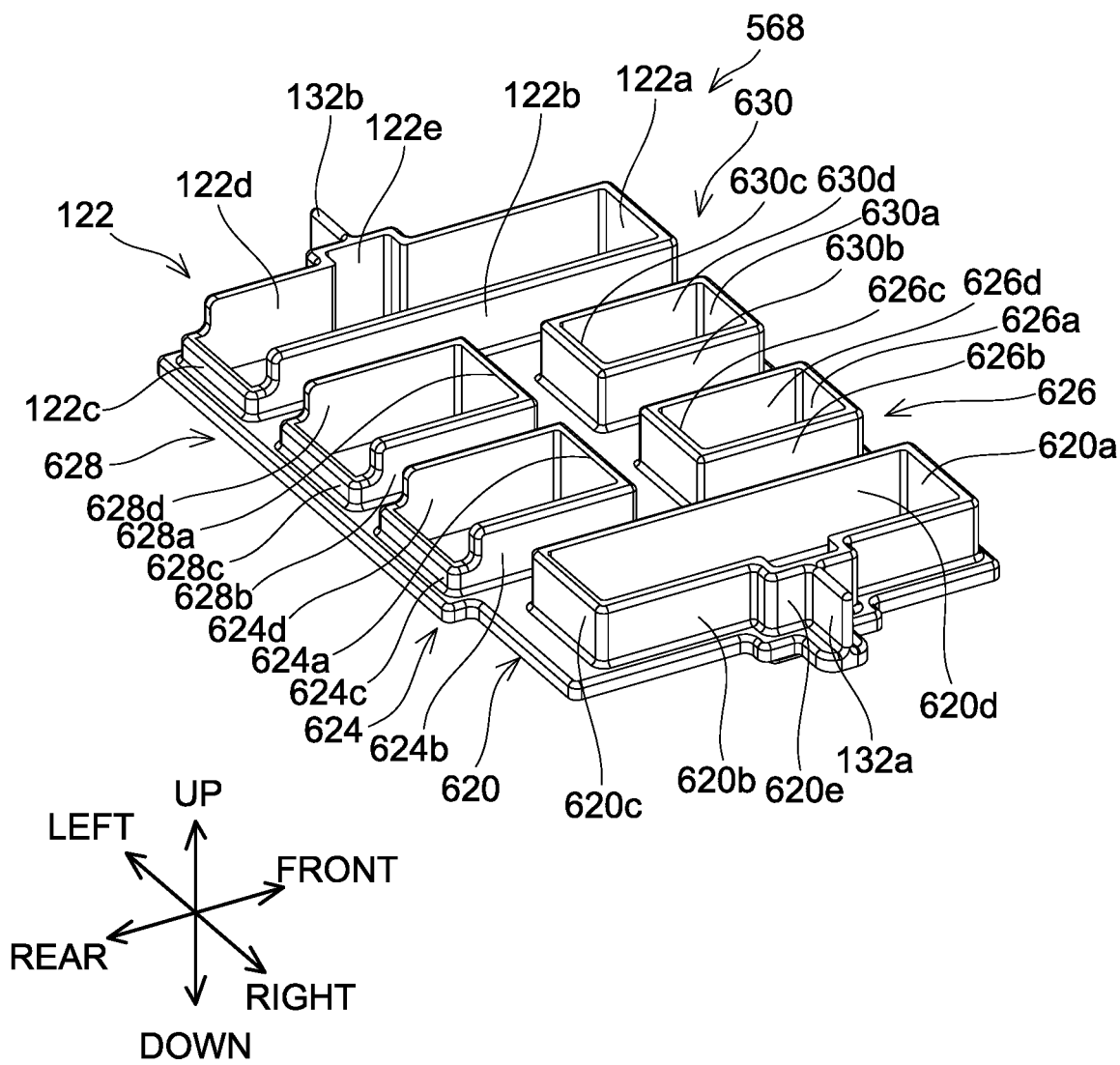
FIG. 21 is a perspective view seeing the terminal cover 568 of the third embodiment from the rear right upper side.

As shown in FIG. 20, the terminal cover 568 includes six peripheral walls 620, 122, 624, 626, 628, 630, two extension walls 132a, 132b, and coupling parts 134. The peripheral wall 620 is composed of a front wall 620a, a right wall 620b, a rear wall 620c, and a left wall 620d. A protruding part 620e protruding to the outer side (right side) is disposed at a center of the right wall 620b in the front-rear direction. As shown in FIG. 21, no opening is defined at a lower portion of the rear wall 620c. As shown in FIG. 20, the peripheral wall 624 is composed of a front wall 624a, a right wall 624b, a rear wall 624c, and a left wall 624d. The peripheral wall 626 is composed of a front wall 626a, a right wall 626b, a rear wall 626c, and a left wall 626d. The peripheral wall 628 is composed of a front wall 628a, a right wall 628b, a rear wall 628c, and a left wall 628d. The peripheral wall 630 is composed of a front wall 630a, a right wall 630b, a rear wall 630c, and a left wall 630d. This is different from the terminal cover 68 of the first embodiment (see FIG. 12) in that the front wall 624a of the peripheral wall 624 and the rear wall 626c of the peripheral wall 626 are not integrated as one and the front wall 628a of the peripheral wall 628 and the rear wall 630c of the peripheral wall 630 are not integrated as one.

Figure 19:
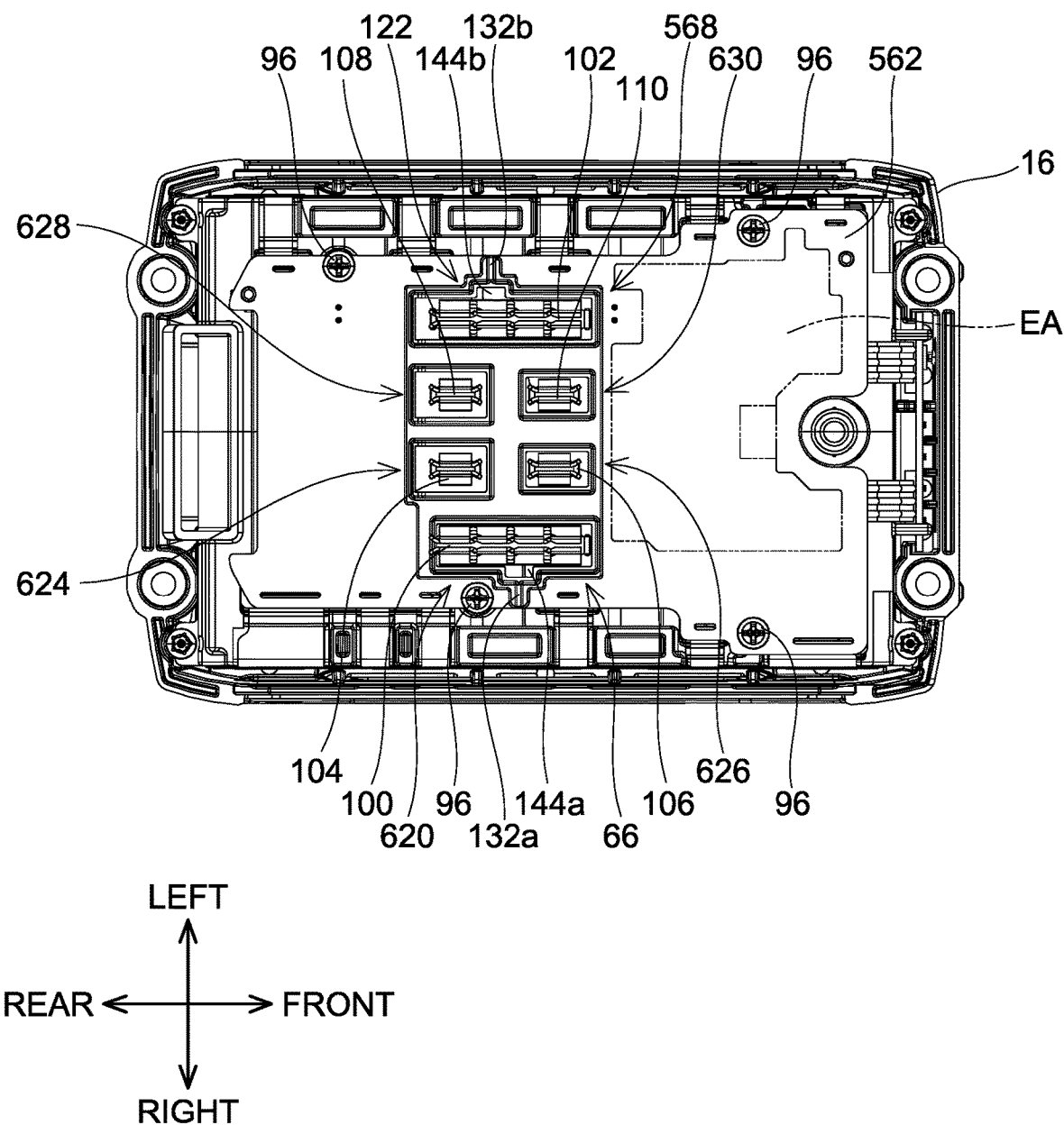
FIG. 19 is a top view seeing a battery module 10 and a lower case 16 from above in a third embodiment.

As shown in FIG. 19, in a state where the terminal cover 568 is attached to an upper surface of the control board 562, each of the terminals 100, 102, 104, 106, 110 is surrounded fully around its four sides by its corresponding one(s) of the peripheral walls 620, 122, 624, 626, 628, 630. Although not shown in the drawings, the board holes 146a, 146b are not defined in the control board 562 between the first battery-side signal terminal 104 and the second battery-side signal terminal 106 and also between the third battery-side signal terminal 108 and the fourth battery-side signal terminal 110. According to the above configuration, each of the terminals 100, 102, 104, 106, 110 is partitioned from the other terminals by two walls. With such a configuration as well, same effects as those of the battery pack 2 of the first embodiment can be achieved. In a variant, the terminal cover 568 may not include the extension walls 132a, 132b.

Fourth Embodiment

Points that differ from the battery pack 2 of the first embodiment will be described with reference to FIGS. 22 to 24. A battery pack 2 of a fourth embodiment differs in structures of its control board 762 and terminal cover 768 from the structures of the control board 62 and the terminal cover 68 of the battery pack 2 of the first embodiment.

The terminal cover 768 of the present embodiment differs in a structure of its coupling parts 834 from the coupling parts 134 in the terminal cover 68 of the first embodiment. As shown in FIGS. 23 and 24, an upper surface of each coupling part 834 has an inclined part 834a that is inclined such that its rear side is located lower than its front side.

Figure 22:
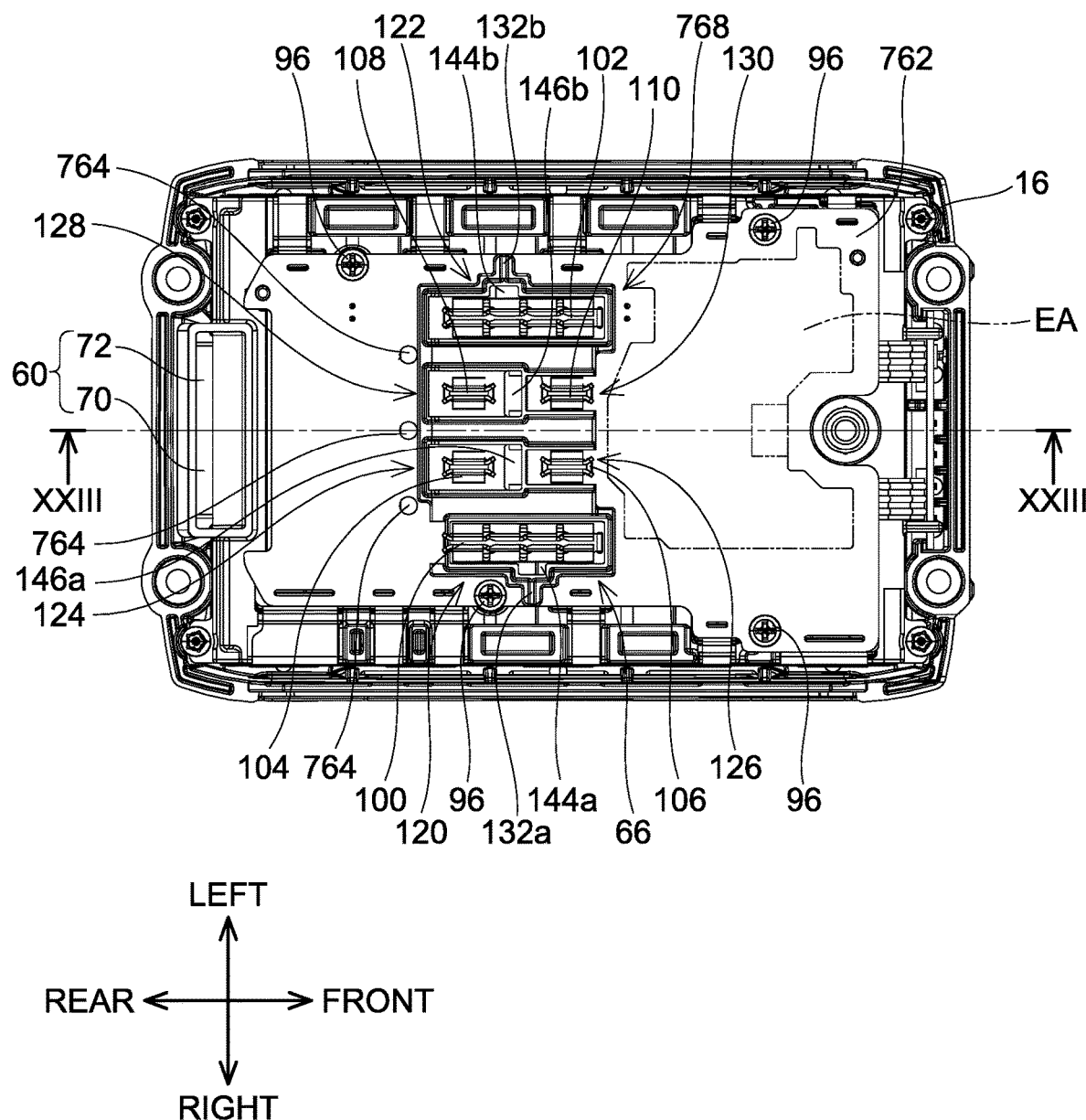
FIG. 22 is a top view seeing a battery module 10 and a lower case 16 from above in a fourth embodiment.
Figure 23:
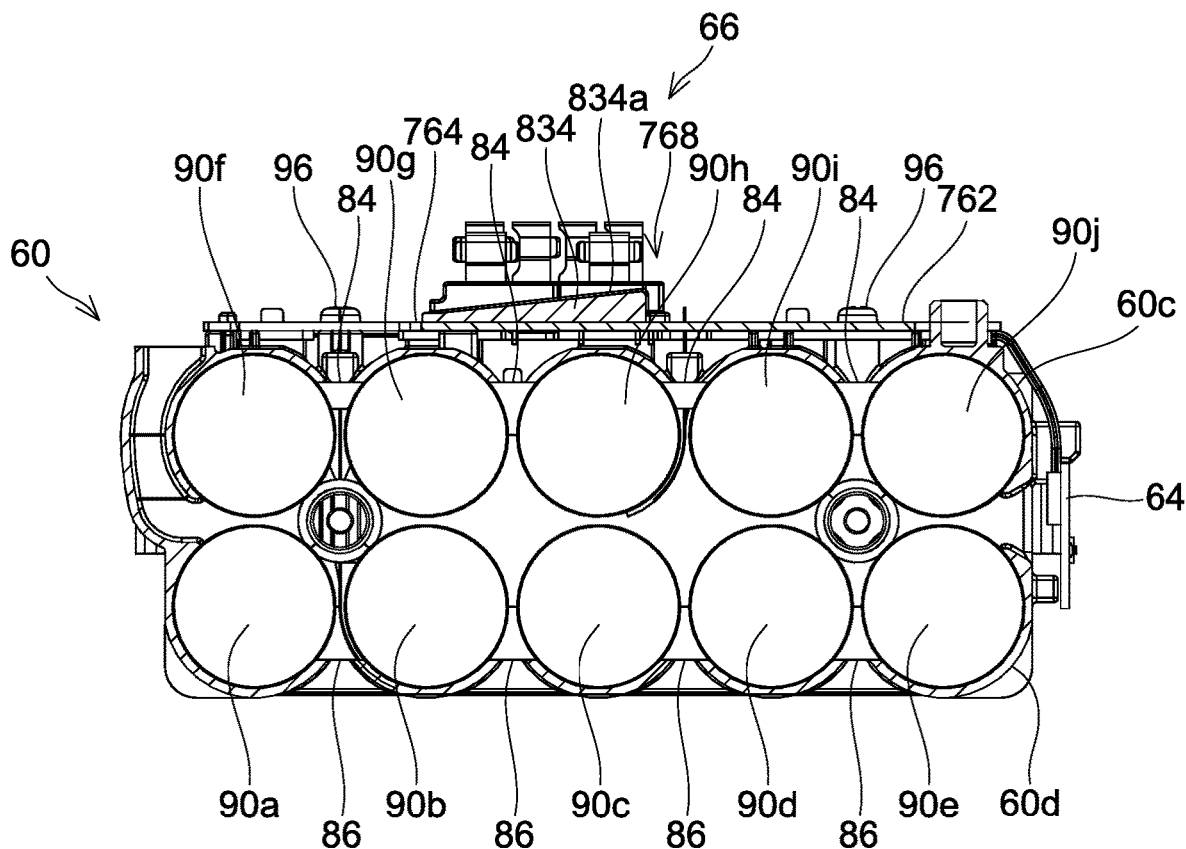
FIG. 23 is a cross-sectional view along a line XXIII-XXIII in FIG. 22.
Figure 23:
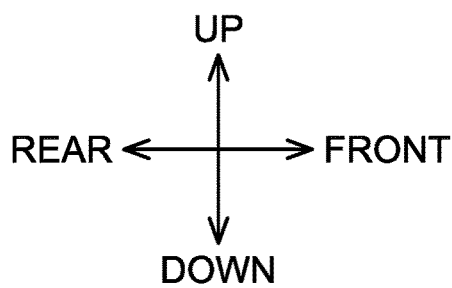

As shown in FIGS. 22 and 23, board holes 764 are defined in the control board 762. The board holes 764 are disposed more on the rear side than the inclined parts 834a of the coupling parts 834 are.

In one or more aspects, as shown in FIG. 23, an upper surface of each of the coupling parts 834 of the terminal cover 768 includes an inclined part 834a inclined such that the surface on the rear side is located lower than the surface on the front side. According to the above configuration, water that reached the upper surfaces of the coupling parts 834 flows along the inclined parts 834a and out of the coupling parts 834. Due to this, the water can be suppressed from being collected on the upper surfaces of the coupling parts 834. Thus, the water that has been collected in the coupling parts 834 can be suppressed from flowing over the walls.

In one or more aspects, as shown in FIG. 23, the inclined parts 834a are each inclined such that the surface on the rear side is located lower than the surface on the front side. The board holes 764 are defined in the control board 762 more on the rear side than the coupling parts 834 are. According to the above configuration, the water that reached the upper surfaces of the coupling parts 834 flows along the inclined parts 834a and out of the coupling parts 834, and flows through the board holes 764. As such, the water can be suppressed from being collected on an upper surface of the control board 762.

Figure 24:
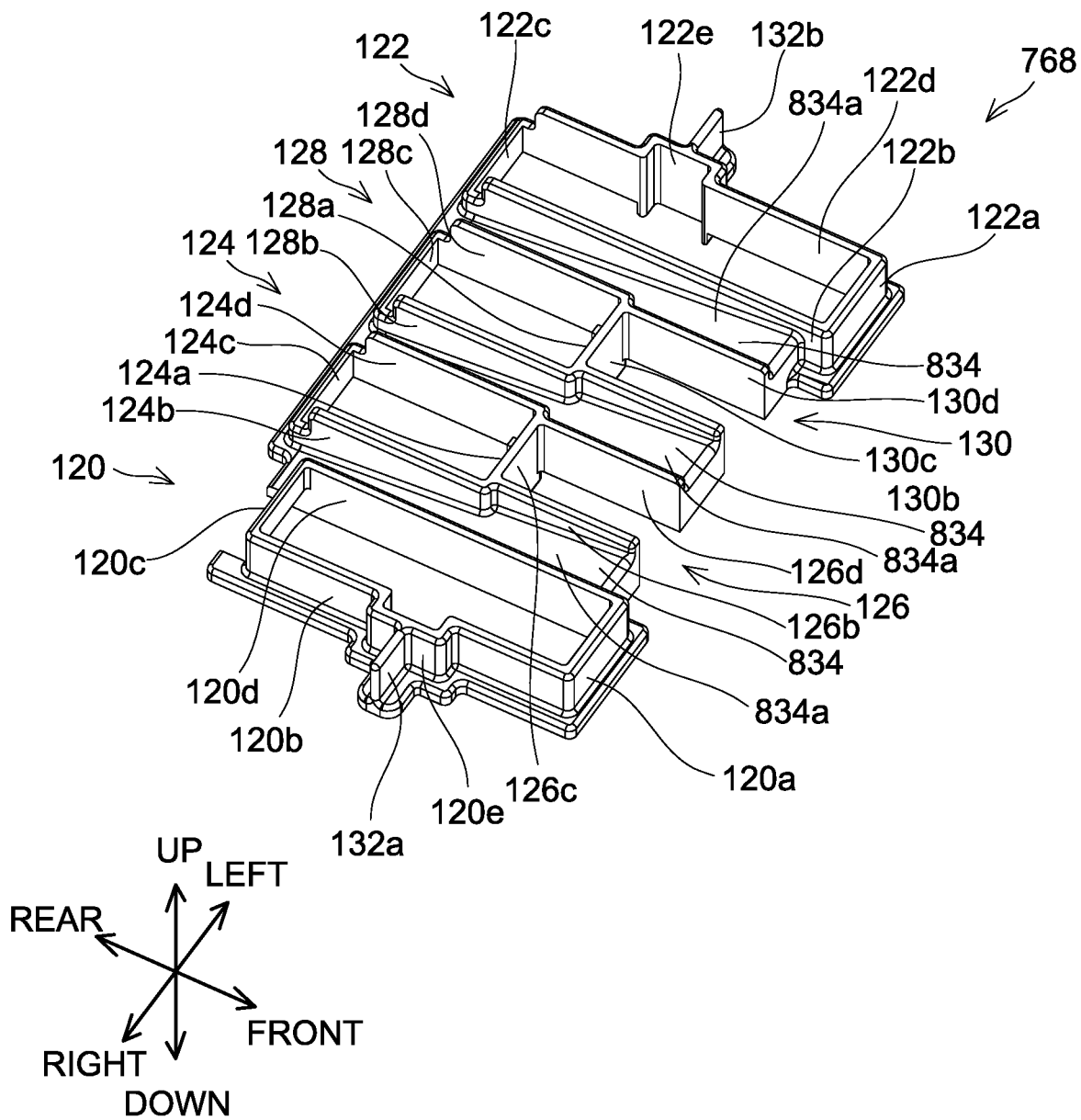
FIG. 24 is a perspective view seeing a terminal cover 768 of the fourth embodiment from the front right upper side.

In one or more aspects, as shown in FIG. 24, the coupling part 834 located rightmost couples between the left wall 120d of the peripheral wall 120 and the right wall 126b of the peripheral wall 126, as well as between the left wall 120d of the peripheral wall 120 and the right wall 124b of the peripheral wall 124. According to the above configuration, water can be suppressed from being collected between the battery-side negative electrode terminal 100 and the second battery-side signal terminal 106 and also between the battery-side negative electrode terminal 100 and the first battery-side signal terminal 104. As such, the terminals adjacent in the left-right direction can be suppressed from being short-circuited.

Further, as shown in FIG. 24, the coupling part 834 located leftmost couples between the right wall 122b of the peripheral wall 122 and the left wall 130d of the peripheral wall 130 as well as between the right wall 122b of the peripheral wall 122 and the left wall 128d of the peripheral wall 128. According to the above configuration, water can be suppressed from being collected between the battery-side positive electrode terminal 102 and the fourth battery-side signal terminal 110 and also between the battery-side positive electrode terminal 102 and the third battery-side signal terminal 108. As such, the terminals adjacent in the left-right direction can be suppressed from being short-circuited.

(Corresponding Relationship)

In one aspect, the battery-side negative electrode terminal 100 is an example of "first terminal". The second battery-side signal terminal 106 is an example of "second terminal". The first battery-side signal terminal 104 is an example of "third terminal". The left wall 120*d* is an example of "first partition wall extending in the front-rear direction". The right wall 126*b* is an example of "second partition wall disposed between the first partition wall and the second terminal in the left-right direction and extending in the front-rear direction". The right wall 124*b* is an example of "third partition wall disposed between the first partition wall and the third terminal in the left-right direction and extending in the front-rear direction". The inclined parts 834*a* are examples of "inclined part". The rear side is an example of "first direction". The front side is an example of "second direction". The board holes 764 are examples of "first control board hole".

Further, in another aspect, the battery-side positive electrode terminal 102 is an example of "first terminal". The fourth battery-side signal terminal 110 is an example of "second terminal adjacent to the first terminal in the left-right direction". The third battery-side signal terminal 108 is an example of "third terminal disposed side by side with the second terminal in the front-rear direction and adjacent to the first terminal in the left-right direction". The peripheral wall 122 is an example of "first partition wall surrounding a periphery of the first terminal". The left wall 130*d* is an example of "second partition wall disposed between the first partition wall and the second terminal". The left wall 128*d* is an example of "third partition wall disposed between the first partition wall and the third terminal". The inclined parts 834*a* are examples of "inclined part". The rear side is an example of "first direction". The front side is an example of "second direction". The board holes 764 are examples of "first control board hole".

Further, in another aspect, the battery-side negative electrode terminal 100 is an example of "first power terminal". The second battery-side signal terminal 106 is an example of "first signal terminal". The first battery-side signal terminal 104 is an example of "second signal terminal". The left wall 120*d* is an example of "first front-rear directional partition wall". The right wall 126*b* is an example of "second front-rear directional partition wall". The right wall 124*b* is an example of "third front-rear directional partition wall". The inclined parts 834*a* are examples of "inclined part". The rear side is an example of "first direction". The front side is an example of "second direction". The board holes 764 are examples of "first control board hole".

Further, in another aspect, the battery-side negative electrode terminal 100 is an example of "first terminal". The second battery-side signal terminal 106 is an example of "second terminal adjacent to the first terminal in the left-right direction". The first battery-side signal terminal 104 is an example of "third terminal disposed side by side with the second terminal in the front-rear direction and adjacent to the first terminal in the left-right direction". The left wall 120*d* is an example of "first front-rear directional partition wall disposed between the first terminal and the second terminal, and extending in the front-rear direction". The right wall 126*b* is an example of "second front-rear directional partition wall disposed between the first front-rear directional partition wall and the second terminal, and extending in the front-rear direction". The right wall 124*b* is an example of "third front-rear directional partition wall disposed between the first front-rear directional partition wall and the third terminal, and extending in the front-rear direction". The inclined parts 834*a* are examples of "inclined part". The rear side is an example of "first direction". The front side is an example of "second direction". The board holes 764 are examples of "first control board hole".

Fifth Embodiment

Points that differ from the battery pack 2 of the first embodiment will be described with reference to FIGS. 25 to 27. A battery pack 2 of a fifth embodiment differs in structures of its control board 962 and terminal cover 968 from the structures of the control board 62 and the terminal cover 68 of the battery pack 2 of the first embodiment.

The terminal cover 968 of the present embodiment differs in a structure of its coupling parts 1034 from the structure of the coupling parts 134 of the terminal cover 68 of the first embodiment. As shown in FIGS. 26 and 27, an upper surface of each of the coupling parts 1034 is composed of a first inclined part 1034*a* inclined such that the surface on the front side is located lower than the surface on the rear side and a second inclined part 1034*b* inclined such that the surface on the rear side is located lower than the surface on the front side. The first inclined parts 1034*a* are disposed on the front side of the second inclined parts 1034*b*.

Figure 25:
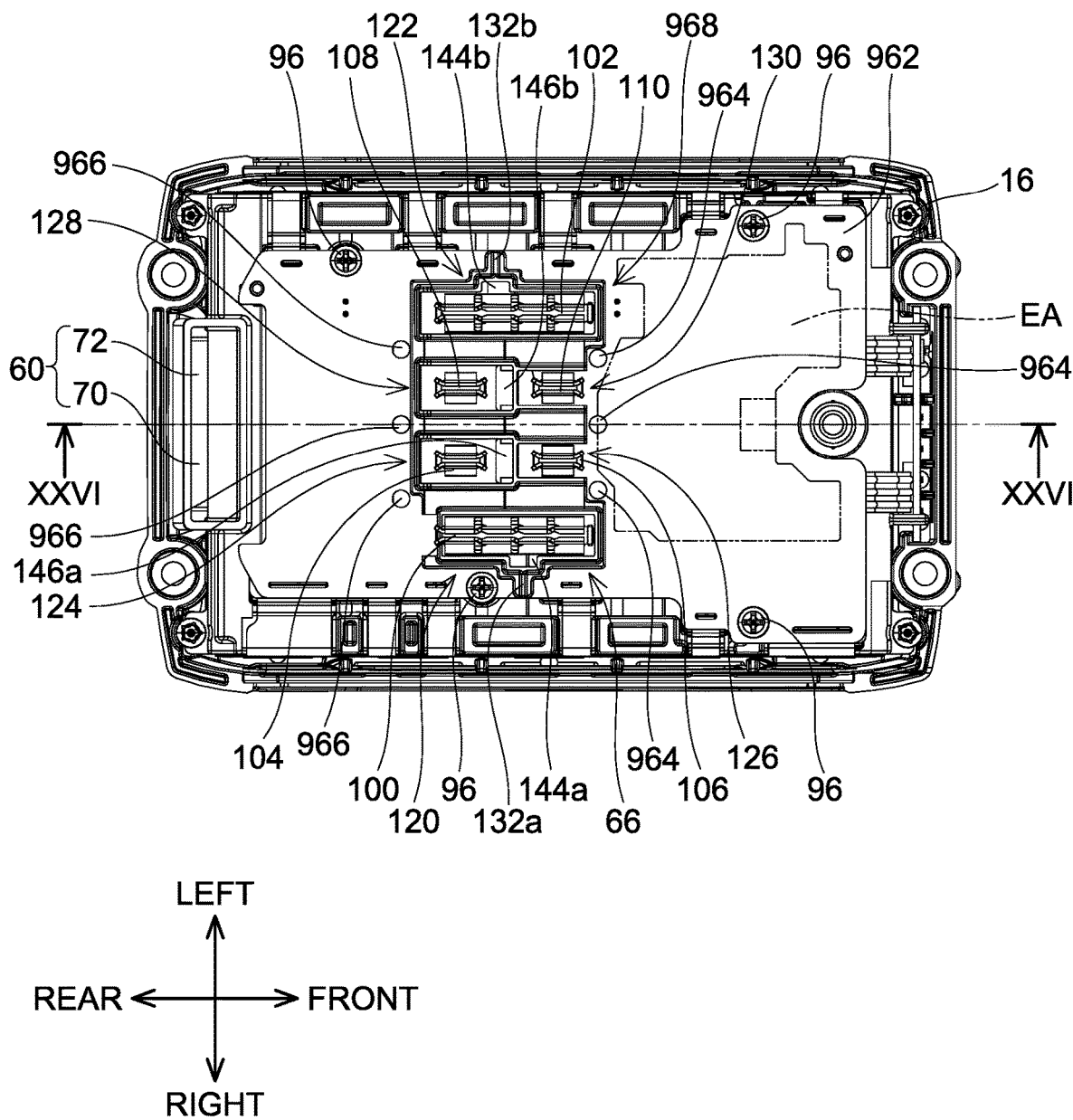
FIG. 25 is a top view seeing a battery module 10 and a lower case 16 from above in a fifth embodiment.
Figure 26:
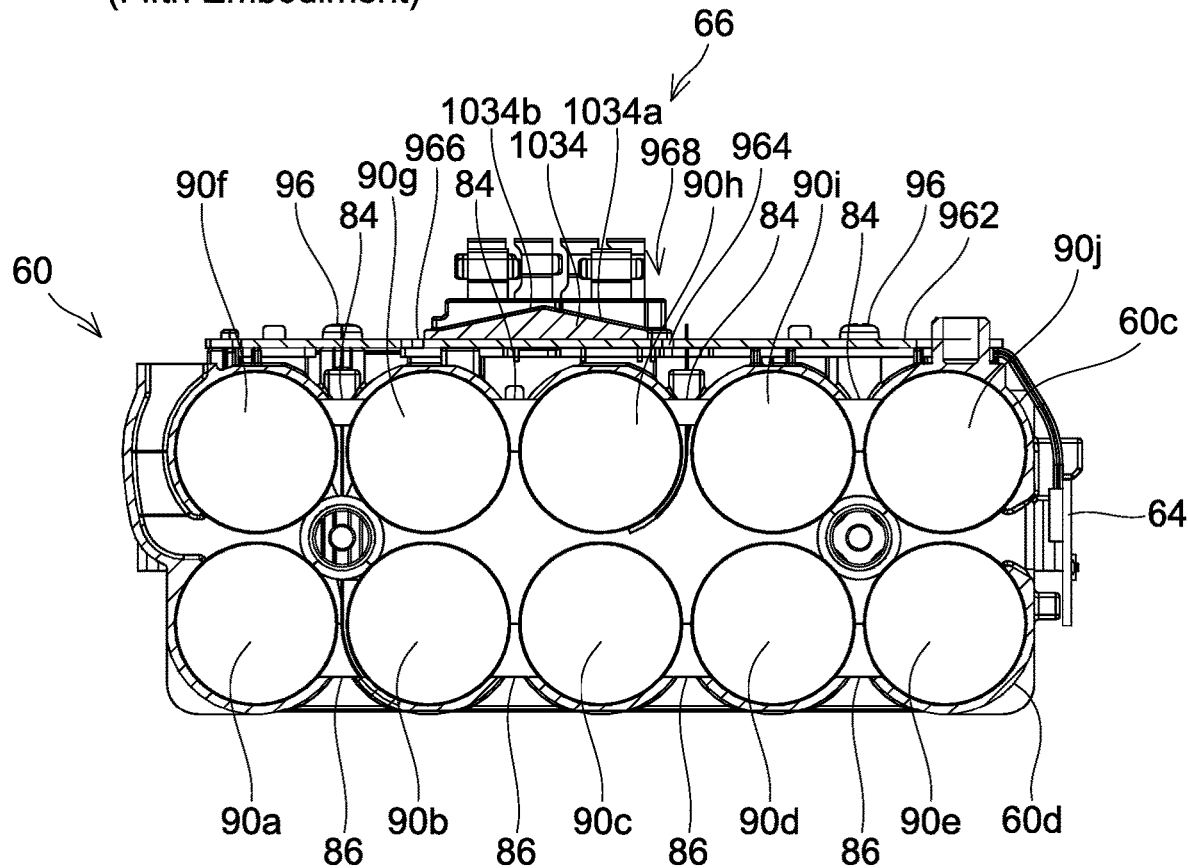
FIG. 26 is a cross-sectional view along a line XXVI-XXVI in FIG. 25.
Figure 26:
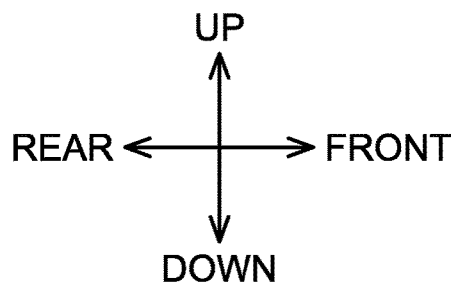
Figure 27:
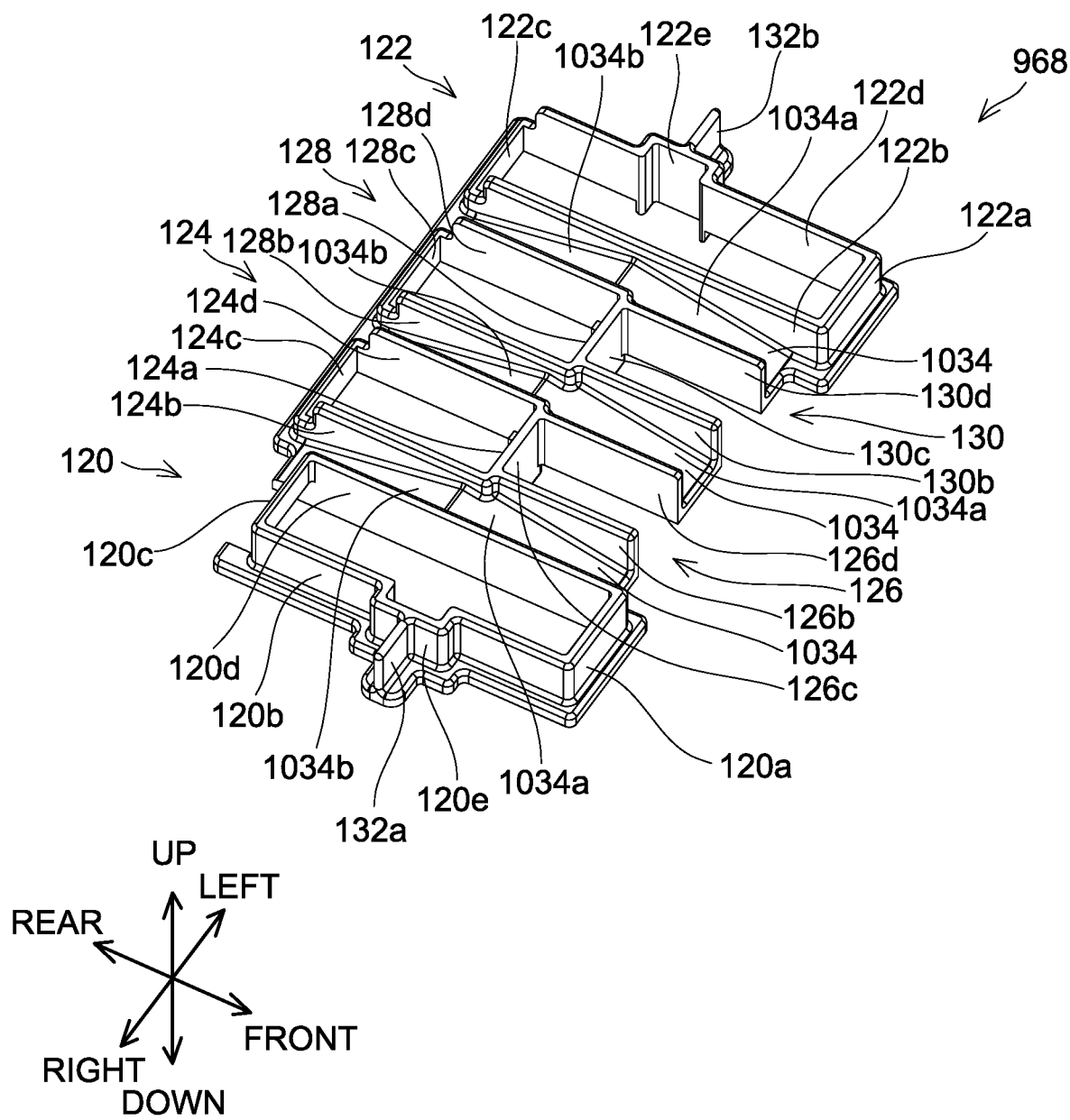
FIG. 27 is a perspective view seeing a terminal cover 968 of the fifth embodiment from the front right upper side.

As shown in FIGS. 25 and 26, board holes 964, 966 are defined in the control board 962. The board holes 964 are disposed more on the front side than the first inclined parts 1034*a* of the coupling parts 1034 are. The board holes 966 are disposed more on the rear side than the second inclined parts 1034*b* of the coupling parts 1034 are.

In one or more aspects, as shown in FIG. 26, the first inclined part 1034*a* and the second inclined part 1034*b* are arranged on the upper surface of each of the coupling parts 1034 of the terminal cover 968. The first inclined part 1034*a* arranged on the front side of the upper surface of each coupling part 1034 is inclined such that the surface on the front side is located lower than the surface on the rear side. Further, the second inclined part 1034*b* arranged on the rear side of the upper surface of each coupling part 1034 is inclined such that the surface on the rear side is located lower than the surface on the front side. According to the above configuration, water that reached the upper surfaces of the coupling parts 1034 flows along the first inclined parts 1034*a* and the second inclined parts 1034*b* and out of the coupling parts 1034. Due to this, the water can be suppressed from being collected on the upper surfaces of the coupling parts 1034. As such, the water that has been collected in the coupling parts 1034 can be suppressed from flowing over the walls.

In one or more aspects, as shown in FIG. 26, the upper surfaces of the coupling parts 1034 of the terminal cover 968 include the first inclined parts 1034*a* and the second inclined parts 1034*b*. Further, the board holes 964 are defined in the control board 962 more on the front side than the coupling parts 1034 are. Further, the board holes 966 are defined in the control board 962 more on the rear side than the coupling parts 1034 are. According to the above configuration, the water that reached the upper surfaces of the coupling parts 1034 flows along the first inclined parts 1034*a* and the second inclined parts 1034*b* and out of the coupling parts 1034, and flows through the board holes 964, 966. As such, the water can be suppressed from being collected on an upper surface of the control board 962.

(Corresponding Relationship)

The first inclined parts 1034*a* and the second inclined parts 1034*b* are examples of "inclined part". When the first inclined parts 1034*a* are the example of the "inclined part", the front side is an example of "first direction" and the rear side is an example of "second direction". When the second inclined parts 1034*b* are the example of the "inclined part", the rear side is the example of "first direction" and the front side is the example of "second direction". The board holes 964, 966 are examples of "first control board hole".

Sixth Embodiment

Figure 28:
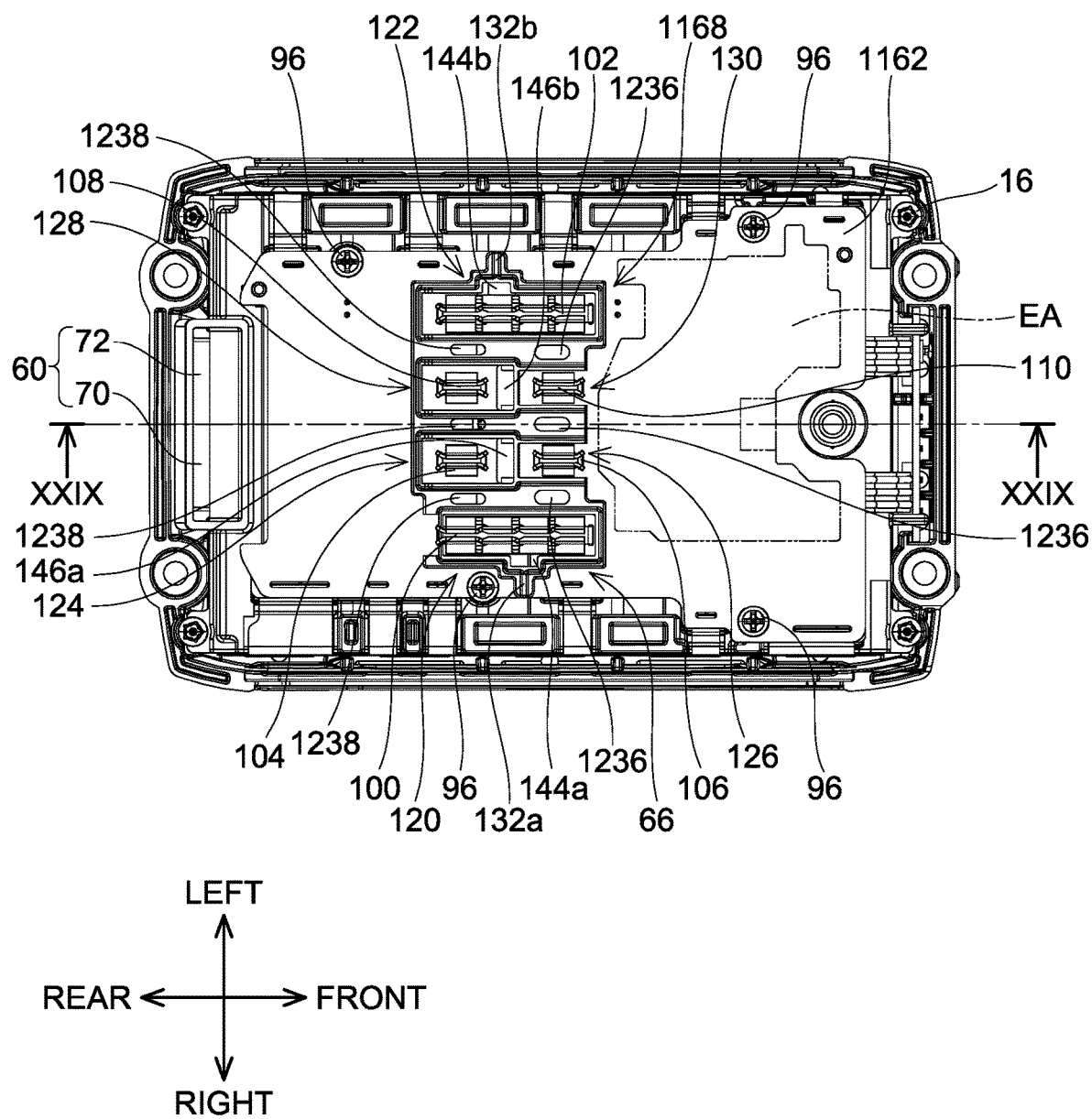
FIG. 28 is a top view seeing a battery module 10 and a lower case 16 from above in a sixth embodiment.

Points that differ from the battery pack 2 of the first embodiment will be described with reference to FIGS. 28 to 30. A battery pack 2 of a sixth embodiment differs in structures of its control board 1162 and terminal cover 1168 from the structures of the control board 62 and the terminal cover 68 of the battery pack 2 of the first embodiment.

The terminal cover 1168 of the present embodiment differs in a structure of its coupling parts 1234 from the structure of the coupling parts 134 of the terminal cover 68 of the first embodiment. As shown in FIGS. 28 to 30, upper surfaces of the coupling parts 1234 are parallel to a plane including the front-rear direction and the left-right direction. Each coupling part 1234 includes a front cover hole 1236 and a rear cover hole 1238. These front cover hole 1236 and rear cover hole 1238 are disposed side by side in the front-rear direction. The front cover hole 1236 is disposed more on the front side than the rear cover hole 1238 is.

As shown in F 1G. 29, board holes 1164, 1166 are defined in the control board 1162 below the coupling parts 1234. The board holes 1164, 1166 are disposed side by side in the front-rear direction. The board hole 1164 is disposed more on the front side than the board hole 1166 is. Each board hole 1164 is disposed below its corresponding front cover hole 1236 and each board hole 1166 is disposed below its corresponding rear cover hole 1238. A size of the board holes 1164, 1166 is larger than a size of the front cover hole 1236 and the rear cover hole 1238.

Figure 29:
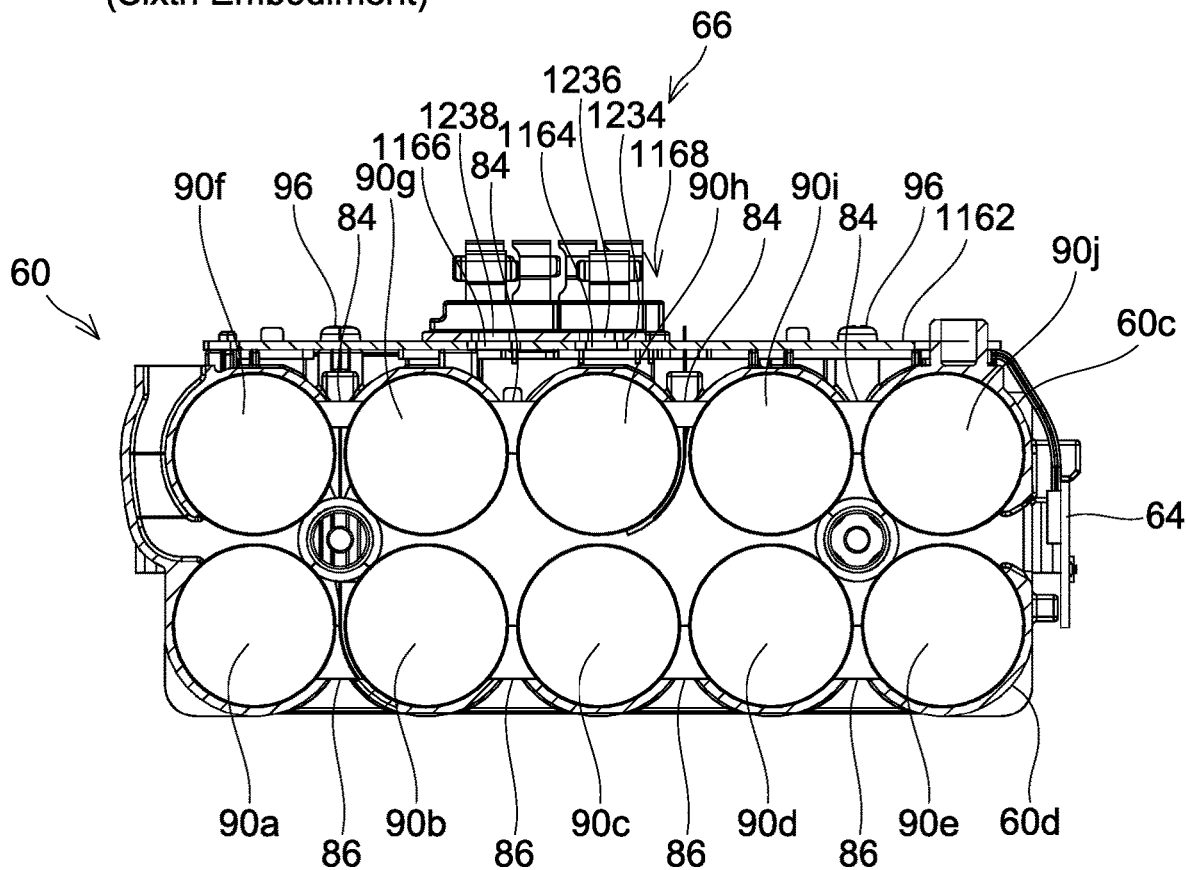
FIG. 29 is a cross-sectional view along a line XXIX-XXIX in FIG. 28.
Figure 29:
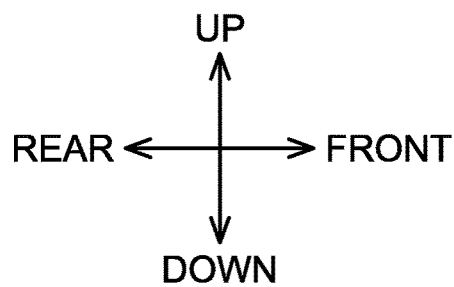
Figure 30:
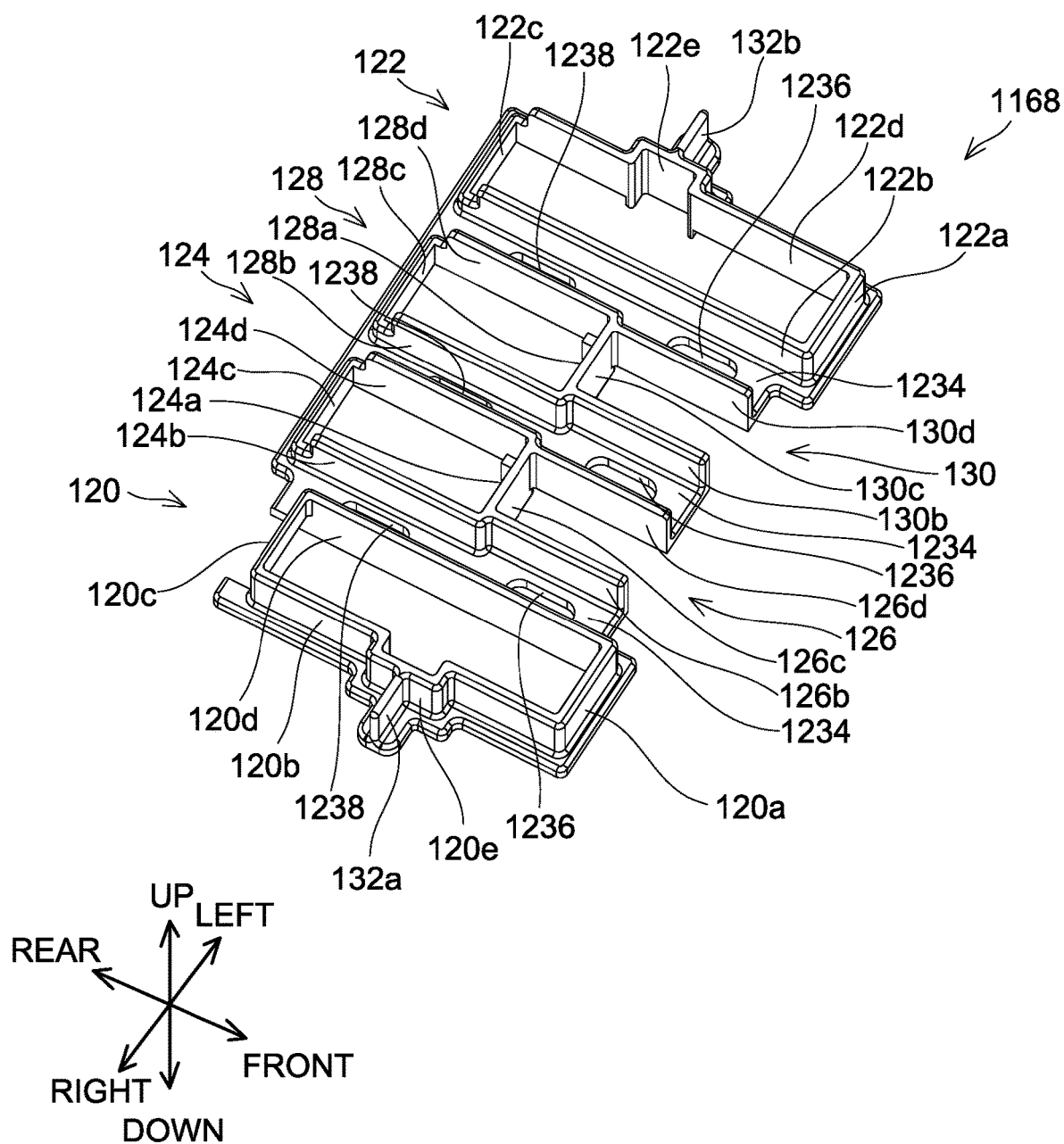
FIG. 30 is a perspective view seeing a terminal cover 1168 of the sixth embodiment from the front right upper side.

In one or more aspects, as shown in FIG. 29, the cover holes 1236, 1238 are defined in the coupling parts 1234 of the terminal cover 1168, and the board holes 1164, 1166 are defined in the control board 1162 below the cover holes 1236, 1238. According to the above configuration, water that reached the upper surfaces of the coupling parts 1234 flows through the cover holes 1236, 1238 and the board holes 1164, 1166. Due to this, the water can be suppressed from being collected on the upper surfaces of the coupling parts 1234. As such, the water that has been collected in the coupling parts 1234 can be suppressed from flowing over the walls.

(Corresponding Relationship)

The cover holes 1236, 1238 are examples of "through hole". The board holes 1164, 1166 are examples of "second control board hole".

While specific examples of the present disclosure have been described above in detail, these examples are merely illustrative and place no limitation on the scope of the patent claims. The technology described in the patent claims also encompasses various changes and modifications to the specific examples described above.

(First Variant) The heights of the walls of the terminal cover 68 may all be same.

(Second Variant) The case holes 76, 80, 84, 86 may not be defined in the cell case 60. Further, in another variant, at least one of the case holes 76, 80, 84, 86 may not be defined.

(Third Variant) In the above embodiment, the protruding parts 74, 78 are disposed to suppress the positional displacement of the cell case 60 and the upper case 14. In a variant, the protruding parts 74, 78 may be disposed to support the control board 62 that is to be set above the cell case 60, or may be disposed to increase a creepage distance between the lead plates 92 in the front-rear direction.

(Fourth Variant) The board holes 144a, 144b may be defined in front of or behind the battery-side negative electrode terminal 100 and the battery-side positive electrode terminal 102 located outermost in the left-right direction.

(Fifth Variant) In the fourth and fifth embodiments, the board holes 764, 964, 966 may not be defined in the control boards 762, 962.

(Sixth Variant) In the terminal cover 768 of the fourth embodiment, a part of the upper surfaces of the coupling parts 834 may be parallel to the plane including the front-rear direction and the left-right direction.

(Seventh Variant) The coupling parts 134, 834, 1034, 1234 of the respective embodiments may be coupled to only apart of the peripheral walls 120, 122, 124, 168, 128, 130 that are adjacent in the left-right direction. For example, in the terminal cover 768 of the fourth embodiment, the coupling part 834 located rightmost may couple the left wall 120d of the peripheral wall 120 and the right wall 126b of the peripheral wall 126, however, it may not couple the left wall 120d of the peripheral wall 120 and the right wall 124b of the peripheral wall 124.

(Eighth Variant) The terminal cover 1168 of the sixth embodiment may not include the coupling parts 1234. That is, the peripheral wall 120 and the peripheral walls 124, 126 are not coupled. Further, the peripheral walls 124, 126 and the peripheral walls 128, 130 are not coupled. Further, the peripheral walls 128, 130 and the peripheral wall 122 are not coupled. Further, the board holes 1164, 1166 are defined in the control board 1162 that is between the peripheral wall 120 and the peripheral walls 124, 126, between the peripheral walls 124, 126 and the peripheral walls 128, 130, and between the peripheral walls 128, 130 and the peripheral wall 122. In the present variant, for example, water that reached the control board 1162 between the left wall 120d of the peripheral wall 120 and the right wall 124b of the peripheral wall 124 flows through the board holes 1164, 1166 defined in the control board 1162 and reaches the upper surface 60c of the cell case 60.

The technical elements explained in the present description or drawings provide technical utility either independently or through various combinations. The present disclosure is not limited to the combinations recited in the claims as originally filed. Further, the purpose of the examples illustrated by the present description or drawings is to satisfy multiple objectives simultaneously, and satisfying any one of those objectives gives technical utility to the present disclosure.

REFERENCE SIGNS LIST

2: battery pack, 10: battery module, 12: outer case, 14: upper case, 14a: upper surface, 16: lower case, 16a: bottom surface, 18: screw, 20: slide rail, 22: terminal reception part, 22a: terminal opening, 24: hook, 24a: operable part, 24b: protruding part, 30: display unit, 30a: remaining charge indicator, 30b: button, 32: hole, 60: cell case, 60a: right side surface, 60b: left side surface, 60c: upper surface, 60d: lower surface, 60e1 to 60e4: cavity, 62: control board, 64: LED board, 66: terminal, 68: terminal cover, 70: right cell case, 72: left cell case, 74: protruding part, 76: case hole, 78: protruding part, 80: case hole, 82: protruding part, 84: case hole, 86: case hole, 88: depressed portion, 90a to 90j: battery cell, 92a to 92k: lead plate, 96: screw, 100: battery-side negative electrode terminal, 102: battery-side positive electrode terminal, 104: first battery-side signal terminal, 106: second battery-side signal terminal, 108: third battery-side signal terminal, 110: fourth battery-side signal terminal, 120, 122, 124, 126, 128, 130: peripheral wall, 132*a*, 132*b*: extension wall, 134: coupling part, 136: opening, 142*a* to 142*l*: terminal connector, 144*a*, 144*b*, 146*a*, 146*b*: board hole, 200: power tool, 202: terminal unit, 210: tool-side negative electrode terminal 212: tool-side positive electrode terminal, 214: first tool-side signal terminal, 216: second tool-side signal terminal, 218: third tool-side signal terminal, 368: terminal cover, 420, 426, 430: peripheral wall, 562: control board, 568: terminal cover, 620, 624, 626, 628, 630: peripheral wall, EA: element area, 762: control board, 764: board hole, 768: terminal cover, 834: coupling part, 834*a*: inclined part, 962: control board, 964, 966: board hole, 968: terminal cover, 1034: coupling part, 1034*a*: first inclined part, 1034*b*: second inclined part, 1162: control board, 1164, 1166: board hole, 1168: terminal cover, 1234: coupling part, 1236: front cover hole, 1238: rear cover hole, EA: element area

The invention claimed is:

1. A battery pack configured to be mounted on a power tool by being slid from front to rear, the battery pack comprising:
   a battery cell;
   a control board disposed above the battery cell and connected to the battery cell;
   a plurality of terminals disposed on the control board and disposed side by side in a left-right direction;
   a plurality of partition walls disposed on the control board; and
   an outer case housing the battery cell, the control board, the plurality of terminals, and the plurality of partition walls, and having an upper surface comprising a terminal reception part configured to receive a terminal of the power tool,
   wherein the plurality of terminals includes a first terminal and a second terminal adjacent to the first terminal in the left-right direction, and at least two of partition walls among the plurality of partition walls are disposed between the first terminal and the second terminal,
   wherein the at least two partition walls, which are disposed between the first terminal and the second terminal, include a first partition wall extending in a front-rear direction and a second partition wall disposed between the first partition wall and the second terminal and extending in the front-rear direction, and
   the battery pack further comprises:
   a coupling part coupling the first partition wall and the second partition wall,
   wherein an inclined part inclined in the front-rear direction is disposed on at least a part of an upper surface of the coupling part.

2. The battery pack according to claim 1, wherein the inclined part is inclined such that a surface of the inclined part on a first direction side in the front-rear direction is located lower than a surface of the inclined part on a second direction side opposite to the first direction side, and
   a first control board hole is defined in the control board more on the first direction side than the coupling part is.

3. The battery pack according to claim 1, wherein the plurality of terminals includes a third terminal disposed side by side with the second terminal in the front-rear direction and adjacent to the first terminal in the left-right direction,
   the first partition wall extends in the front-rear direction such that the first partition wall is disposed between the first terminal and the second terminal and disposed between the first terminal and the third terminal,
   the plurality of partition walls includes a third partition wall disposed between the first partition wall and the third terminal and extending in the front-rear direction, and
   the coupling part couples the first partition wall and the third partition wall.

4. A battery pack configured to be mounted on a power tool by being slid from front to rear, the battery pack comprising:
   a battery cell;
   a control board disposed above the battery cell and connected to the battery cell;
   a plurality of terminals disposed on the control board and disposed side by side in a left-right direction;
   a plurality of partition walls disposed on the control board; and
   an outer case housing the battery cell, the control board, the plurality of terminals, and the plurality of partition walls, and having an upper surface comprising a terminal reception part configured to receive a terminal of the power tool,
   wherein the plurality of terminals includes a first terminal and a second terminal adjacent to the first terminal in the left-right direction, and
   at least two of partition walls among the plurality of partition walls are disposed between the first terminal and the second terminal,
   wherein the at least two partition walls, which are disposed between the first terminal and the second terminal, include a first partition wall extending in a front-rear direction and a second partition wall disposed between the first partition wall and the second terminal and extending in the front-rear direction, and
   the battery pack further comprises:
   a coupling part coupling the first partition wall and the second partition wall,
   wherein a through hole is defined in the coupling part, and
   a second control board hole is defined in the control board that is below the through hole.

5. A battery pack configured to be mounted on a power tool by being slid, the battery pack comprising:
   a battery cell;
   a control board disposed above the battery cell and connected to the battery cell;
   a plurality of terminals disposed on the control board;
   a first partition wall disposed on the control board and surrounding a periphery of a first terminal among the plurality of terminals; and
   an outer case having an upper surface comprising a terminal reception part configured to receive a terminal of the power tool,
   wherein a board hole is defined in the control board that is inside the first partition wall.

6. The battery pack according to claim 5, further comprising:
   two or more battery cells; and
   a cell case housed inside the outer case, holding the two or more of battery cells, and disposed below the control board,
   wherein the two or more battery cells are disposed parallel to a bottom surface of the outer case and with an interval between each other, and
   the cell case comprises a case hole defined between two adjacent battery cells among the two or more battery cells.

7. The battery pack according to claim 6, wherein
the case hole of the cell case comprises a first case hole defined in an upper surface of the cell case that is between the two adjacent battery cells and a second case hole defined in a lower surface of the cell case at a position opposed to the first case hole,
the first case hole penetrates through the upper surface of the cell case in an up-down direction, and
the second case hole penetrates through the lower surface of the cell case in the up-down direction.

8. The battery pack according to claim 6, wherein
a protruding part extending upward is disposed on an upper surface of the cell case that is between the two adjacent battery cells at ends of the battery cells in a longitudinal direction, and
the case hole of the cell case comprises a third case hole defined in the protruding part and penetrating through the protruding part in the longitudinal direction of the battery cells.

9. A battery pack configured to be mounted on a power tool by being slid from front to rear, the battery pack comprising:
a battery cell;
a control board disposed above the battery cell and connected to the battery cell;
a plurality of terminals disposed on the control board;
one or more partition walls disposed on the control board; and
an outer case having an upper surface comprising a terminal reception part configured to receive a terminal of the power tool,
wherein the plurality of terminals includes one or more power terminals and one or more signal terminals disposed side by side with the one or more power terminals in a left-right direction,
a first front-rear directional partition wall extending in a front-rear direction is disposed between the power terminal and the signal terminal that are disposed side by side at a frontmost side among the plurality of power terminals and the plurality of signal terminals that are disposed side by side in the left-right direction, and
a left-right directional partition wall extending in the left-right direction is disposed in front of one of the power terminal and the signal terminal that are disposed side by side at the frontmost side, and the left-right directional partition wall is not disposed in front of another of the power terminal and the signal terminal that are disposed side by side at the frontmost side.

10. The battery pack according to claim 9, wherein
the one or more power terminals include a first power terminal that is the power terminal of the power terminal and the signal terminal that are adjacent to each other among the power terminal and the signal terminal disposed side by side at the frontmost side,
the one or more signal terminals include a first signal terminal that is the signal terminal of the power terminal and the signal terminal that are adjacent to each other,
the first front-rear directional partition wall is disposed between the first power terminal and the first signal terminal in the left-right direction, and
the left-right directional partition wall is disposed in front of one of the first power terminal and the first signal terminal, and the left-right directional partition wall is not disposed in front of another of the first power terminal and the first signal terminal.

11. The battery pack according to claim 10, wherein
a first board hole is defined in the control board on an outer side of a terminal disposed at an outermost side in the left-right direction among the plurality of terminals.

12. The battery pack according to claim 9, wherein
a second board hole is defined in the control board between two terminals adjacent to each other in the front-rear direction among the plurality of terminals.

13. A battery pack configured to be mounted on a power tool by being slid, the battery pack comprising:
a battery cell;
a control board disposed above the battery cell and connected to the battery cell;
a plurality of terminals disposed on the control board;
one or more partition walls disposed on the control board; and
an outer case housing the battery cell, the control board, the plurality of terminals, and the one or more partition walls, the outer case having an upper surface comprising a terminal reception part configured to receive a terminal of the power tool,
wherein the plurality of terminals includes one or more power terminals configured to be connected to a terminal of the power tool and one or more signal terminals configured to be connected to a terminal of the power tool, and
all of the plurality of the terminals are separated from other terminals by at least one partition wall among the one or more partition walls,
wherein the battery pack is configured to be mounted on the power tool by being slid from front to rear,
the one or more partition walls include a plurality of left-right directional partition walls extending in a left-right direction,
the plurality of left-right directional partition walls includes a first left-right directional partition wall disposed at a rearmost side and a second left-right directional partition wall disposed more on a front side than the first left-right directional partition wall is, and
a height of the first left-right directional partition wall is lower than a height of the second left-right directional partition wall.

14. The battery pack according to claim 13, wherein
the plurality of terminals include a first terminal and a second terminal adjacent to the first terminal in a left-right direction,
the one or more partition walls include a first front-rear directional partition wall disposed between the first terminal and the second terminal and extending in a front-rear direction and a second front-rear directional partition wall disposed between the first front-rear directional partition wall and the second terminal and extending in the front-rear direction, and
the battery pack further comprises:
a coupling part coupling the first front-rear directional partition wall and the second front-rear directional partition wall,
wherein an inclined part inclined in the front-rear direction is disposed on at least a part of an upper surface of the coupling part.

15. The battery pack according to claim 14, wherein
the inclined part is inclined such that a surface of the inclined part on a first direction side in the front-rear direction is located lower than a surface of the inclined part on a second direction side opposite to the first direction side, and a first control board hole is defined in the control board more on the first direction side than the coupling part is.

16. The battery pack according to claim 14, wherein
the plurality of terminals includes a third terminal disposed side by side with the second terminal in the front-rear direction and adjacent to the first terminal in the left-right direction,
the first front-rear directional partition wall extends in the front-rear direction such that the first front-rear directional partition wall is disposed between the first terminal and the second terminal and between the first terminal and the third terminal, and
the battery pack further comprises:
a third front-rear directional partition wall disposed between the first front-rear directional partition wall and the third terminal and extending in the front-rear direction,
wherein the coupling part couples the first front-rear directional partition wall and the third front-rear directional partition wall.

17. The battery pack according to claim 13, wherein
the one or more signal terminals include a first terminal and a second terminal adjacent to the first terminal in a left-right direction,
the one or more partition walls include a first front-rear directional partition wall disposed between the first terminal and the second terminal and extending in a front-rear direction and a second front-rear directional partition wall disposed between the first front-rear directional partition wall and the second terminal and extending in the front-rear direction, and
the battery pack further comprises:
a coupling part coupling the first front-rear directional partition wall and the second front-rear directional partition wall,
wherein a through hole is defined in the coupling part, and
a second control board hole is defined in the control board that is below the through hole.

* * * * *